(12) United States Patent
Niwa

(10) Patent No.: US 11,637,316 B2
(45) Date of Patent: Apr. 25, 2023

(54) CERAMIC POWDER MATERIAL, SINTERED BODY, AND BATTERY

(71) Applicant: DAIICHI KIGENSO KAGAKU KOGYO CO., LTD., Osaka (JP)

(72) Inventor: Tadahiro Niwa, Osaka (JP)

(73) Assignee: Daiichi Kigenso Kagaku Kogyo Co., Ltd., Osaka (JP)

( * ) Notice: Subject to any disclaimer, the term of this patent is extended or adjusted under 35 U.S.C. 154(b) by 0 days.

(21) Appl. No.: 17/753,211

(22) PCT Filed: Dec. 6, 2021

(86) PCT No.: PCT/JP2021/044664
§ 371 (c)(1),
(2) Date: Feb. 23, 2022

(87) PCT Pub. No.: WO2022/065522
PCT Pub. Date: Mar. 31, 2022

(65) Prior Publication Data
US 2022/0352544 A1 Nov. 3, 2022

(30) Foreign Application Priority Data

Mar. 31, 2021 (JP) .............................. JP2021-060377

(51) Int. Cl.
*H01M 10/0562* (2010.01)
*H01M 10/0525* (2010.01)
(52) U.S. Cl.
CPC ............ *H01M 10/0562* (2013.01); *H01M 10/0525* (2013.01); *H01M 2300/0071* (2013.01)
(58) Field of Classification Search
CPC ............. H01M 10/0562; H01M 2300/0071
See application file for complete search history.

(56) References Cited

U.S. PATENT DOCUMENTS

2011/0053000 A1 3/2011 Kanamura et al.
2011/0053002 A1 3/2011 Yamamura et al.
(Continued)

FOREIGN PATENT DOCUMENTS

CN 107848894 A 3/2018
EP 4006000 A1 * 6/2022
(Continued)

OTHER PUBLICATIONS

Translation of Written Opinion of the International Searching Authority; PCT/JP2021/044664; dated Jan. 25, 2022.
International Search Report issued in PCT/JP2021/044664; dated Jan. 25, 2022.
"Decision to Grant a Patent" Office Action issued in JP 2021-060377; mailed by the Japanese Patent Office dated Jun. 29, 2021.
(Continued)

*Primary Examiner* — Ula C Ruddock
*Assistant Examiner* — Thomas H. Parsons
(74) *Attorney, Agent, or Firm* — Studebaker & Brackett PC

(57) ABSTRACT

A ceramic powder material containing: a first garnet-type compound containing Li, La, and Zr; and a second garnet-type compound containing Li, La, and Zr and having a composition different from a composition of the first garnet-type compound, in which the first garnet-type compound and the second garnet-type compound are represented by Formula [1] $Li_{7-(3x+y)}M1_xLa_3Zr_{2-y}M2_yO_{12}$, where M1 is Al or Ga, M2 is Nb or Ta, the first garnet-type compound satisfies $0 \leq (3x+y) \leq 0.5$, and the second garnet-type compound satisfies $0.5 < (3x+y) \leq 1.5$.

13 Claims, 8 Drawing Sheets

(56) References Cited

U.S. PATENT DOCUMENTS

| | | |
|---|---|---|
| 2011/0244337 A1 | 10/2011 | Ohta et al. |
| 2018/0175446 A1 | 6/2018 | Nishizaki et al. |
| 2019/0084887 A1 | 3/2019 | Yamamoto et al. |
| 2021/0119251 A1 | 4/2021 | Niwa et al. |

FOREIGN PATENT DOCUMENTS

| | | | |
|---|---|---|---|
| JP | 2010-202499 A | | 9/2010 |
| JP | 2011-073962 A | | 4/2011 |
| JP | 2011-073963 A | | 4/2011 |
| JP | 2012-224520 A | | 11/2012 |
| JP | 2013-032259 A | | 2/2013 |
| JP | 2017-511781 A | | 4/2017 |
| JP | 2017-168396 A | | 9/2017 |
| JP | 2020-533769 A | | 11/2020 |
| JP | 6916405 | * | 7/2021 |
| WO | 2019/052648 A1 | | 3/2019 |
| WO | 2019/189275 A1 | | 10/2019 |

OTHER PUBLICATIONS

Huang Xiao et al., "Sintering, micro-structure and Li+ conductivity of $Li_{7-x}La_3Zr_{2-x}Nb_xO_{12}$/MgO (x=0.2-0.7) Li-Garnet composite ceramics," Ceramics International, vol. 45, No. 1, Sep. 13, 2018, pp. 56-63, XP085533202, Elsevier, Amsterdam, NL.

Gong Yu et al., "Effect of sintering process on the microstructure and ionic conductivity of $Li_{7-x}La_3Zr_{2-x}Ta_xO_{12}$ ceramics," Ceramics International, vol. 45, No. 15, Jun. 7, 2019, pp. 18439-18444, XP085774920, Elsevier, Amsterdam, NL.

The extended European search report issued by the European Patent Office dated Sep. 20, 2022, which corresponds to European Application No. 21856921.8-1108 and is related to U.S. Appl. No. 17/753,211.

Communication pursuant to Article 94(3) EPC issued by the European Patent Office dated Jan. 30, 2023, which corresponds to European Application No. 21856921.8-1108 and is related to U.S. Appl. No. 17/753,211.

* cited by examiner

CERAMIC POWDER MATERIAL, SINTERED BODY, AND BATTERY

TECHNICAL FIELD

The present invention relates to a ceramic powder material, a sintered body, and a battery.

BACKGROUND ART

Garnet is a cubic silicate mineral represented by a chemical composition $M^{2+}_3M^{3+}_2Si_3O_{12}$ ($M^{2+}$=Mg, Ca, Mn, or Fe, $M^{3+}$=Al, Cr, or Fe). Garnet-type compounds having a crystal structure similar to that of garnet are not limited to silicates, and all positions of $M^{2+}$, $M^{3+}$, and $Si^{4+}$ ions in the crystal structure can be replaced with ions of various valences. Hence, there are a wide variety of garnet-type compounds having a crystal structure similar to that of garnet. There are substances that are widely utilized in industry among chemically synthesized garnet-type compounds.

In recent years, among garnet-type compounds, $Li_7La_3Zr_2O_{12}$ (hereinafter, also referred to as "LLZ") and LLZ analogs in which various additive elements are introduced into LLZ are regarded as promising solid electrolyte materials for all-solid-state lithium-ion secondary batteries since these have a high lithium-ion conductance and exhibit high electrochemical stability with respect to lithium metal. All-solid-state lithium-ion secondary batteries are a next-generation secondary battery exhibiting ultimate safety since nonflammable solid electrolyte materials are used therein, and research and development of materials and devices are being actively carried out for practical application thereof (see, for example, Patent Documents 1 to 3). Hereinafter, LLZ and LLZ analogs are collectively referred to as "LLZ-based garnet-type compounds".

PRIOR ART DOCUMENTS

Patent Documents

Patent Document 1: JP-A-2013-32259
Patent Document 2: JP-A-2017-168396
Patent Document 3: JP-T-2017-511781

SUMMARY OF THE INVENTION

Problems to be Solved by the Invention

LLZ-based garnet-type compounds are usually powders, and it is said that LLZ-based garnet-type compounds are required to be formed into a dense molded body and sintered at 1,200° C. or more in order to be used as a solid electrolyte.

However, LLZ-based garnet-type compounds undergo a decomposition reaction involving melting and volatilization of Li that is the main component under high temperature conditions exceeding 1,200° C. in an air atmosphere, and there is a problem that deformation and fracture of the sintered body are caused.

As an inexpensive production method of all-solid-state batteries using oxides, a method (integral sintering) in which cells are formed by co-sintering the respective members has been studied, but it is required to perform a heat treatment in a temperature range in which the reaction between the electrolyte and the electrode active material does not occur when this process is conducted.

In Patent Documents 1 to 3, as a method for lowering the sintering temperature when forming a sintered body, it is considered that a low-melting-point compound (for example, lithium borate) is intended to coexist with an LLZ-based garnet-type compound (in particular, see paragraph [0108] of Patent Document 2).

In Patent Documents 1 to 3, it is considered that the sintering temperature can be lowered by melting a low-melting-point compound to form a liquid phase and covering the surface of the LLZ-based garnet-type compound (powder) with this liquid phase. In the present specification, a low-melting-point compound refers to a compound having a melting point of 1,000° C. or less.

However, in such a method, since a large amount of liquid phase is contained, this liquid phase becomes resistance and may cause a decrease in ionic conductance.

The present invention has been made in view of the above-described problems, and an object thereof is to provide a ceramic powder material from which a sintered body that is dense and exhibits excellent lithium-ion conductivity can be obtained under a relatively low temperature condition. Another object of the present invention is to provide a method for producing the ceramic powder material. Another object of the present invention is to provide a battery including a sintered body obtained by sintering the ceramic powder material.

Means for Solving the Problems

The present inventors have carried out intensive research on ceramic powder materials. As a result, surprisingly, the present inventors have found that a ceramic powder material obtained by mixing two specific garnet-type compounds having different compositions is sintered under a relatively low temperature condition. Moreover, the present inventors have found that it is possible to obtain a sintered body that is dense and exhibits excellent lithium-ion conductivity under a relatively low temperature condition when the ceramic powder material is used, and have completed the present invention.

That is, the ceramic powder material according to the present invention includes:

a first garnet-type compound containing Li, La, and Zr; and a second garnet-type compound containing Li, La, and Zr and having a composition different from a composition of the first garnet-type compound, in which the first garnet-type compound and the second garnet-type compound are represented by Formula [1] below:

$$Li_{7-(3x+y)}M1_xLa_3Zr_{2-y}M2_yO_{12} \qquad [1]$$

where M1 is Al or Ga, and M2 is Nb or Ta, the first garnet-type compound satisfies $0 \leq (3x+y) \leq 0.5$, and the second garnet-type compound satisfies $0.5 < (3x+y) \leq 1.5$.

According to the above configuration, since the ceramic powder material contains two types of garnet-type compounds having different Li contents, that is, the first garnet-type compound and the second garnet-type compound, a dense sintered body can be obtained by heating at a relatively low temperature. The present inventors infer that the reason why a dense sintered body is obtained by heating at a low temperature is that element diffusion is promoted at a hetero interface between two types of garnet-type compounds having different Li contents, and thus a dense sintered body is obtained.

In the present invention, it is not necessary to add a sintering auxiliary in an amount that can be a resistance, so that a sintered body with low resistance can be obtained.

The sintered body obtained under a relatively low temperature condition becomes a dense molded body since the progress of the decomposition reaction involving melting and volatilization of Li that is the main component is suppressed. The sintered body obtained becomes a sintered body exhibiting excellent lithium-ion conductivity since sintering occurs even under a relatively low temperature condition.

According to the above configuration, since the ceramic powder material contains the first garnet-type compound and the second garnet-type compound, a sintered body that is dense and exhibits excellent lithium-ion conductivity can be obtained under a relatively low temperature condition.

In the configuration, the absolute value of a difference between the value of (3x+y) of the first garnet-type compound and the value of (3x+y) of the second garnet-type compound is preferably 0.15 or more and 1.5 or less, and the content of the first garnet-type compound is preferably 10% by mass or more and 90% by mass or less when the ceramic powder material is taken as a whole.

When the absolute value of the difference is 0.15 or more and 1.5 or less and the content of the first garnet-type compound is 10% by mass or more and 90% by mass or less, there are many hetero interfaces between the first garnet-type compound and the second garnet-type compound, and the Li concentration gradients of the two types of garnet-type compounds increase during sintering, so that the sinterability is further improved.

In the above configuration, the number of atoms of Li and the number of atoms of La preferably satisfy Formula [2] below.

$$2.0 \leq [(\text{number of atoms of Li})/(\text{number of atoms of La})] \leq 2.5 \quad [2]$$

When Formula [2] is satisfied, the ionic conductivity can be further increased. Accordingly, it can be suitably used as a constituent member of a battery (in particular, a lithium-ion secondary battery).

In the above configuration, the number of atoms of M1, the number of atoms of M2, and the number of atoms of La preferably satisfy Formula [3] below.

$$0.08 \leq [[3 \times (\text{number of atoms of M1}) + (\text{number of atoms of M2})]/(\text{number of atoms of La})] \leq 0.35 \quad [3]$$

When Formula [3] is satisfied, the ionic conductivity can be further increased. Accordingly, it can be suitably used as a constituent member of a battery (in particular, a lithium-ion secondary battery).

In the above configuration, the pore volume of the first garnet-type compound and the pore volume of the second garnet-type compound are preferably 0.4 mL/g or more and 1.0 mL/g or less.

It is necessary to reduce the thickness of the electrolyte member in the all-solid-state battery or the semi-solid-state battery in order to reduce the resistance of the cell. Therefore, the powder as a raw material of the electrolyte member is required to be fine particles of several μm or less.

When the pore volume of the first garnet-type compound and the pore volume of the second garnet-type compound are 0.4 mL/g or more, these compounds contain relatively many voids and are fragile. Such compounds can be easily formed into fine particles without using a strong pulverization method.

In the above configuration, the specific surface area of the first garnet-type compound and the specific surface area of the second garnet-type compound are preferably 0.6 m$^2$/g or more and 2.5 m$^2$/g or less.

When the specific surface area of the first garnet-type compound and the specific surface area of the second garnet-type compound are 0.6 m$^2$/g or more, it can be said that the particles of the ceramic powder material are fine.

In the above configuration, the particle size $D_{50}$ of the first garnet-type compound and the particle size $D_{50}$ of the second garnet-type compound are preferably 0.5 μm or more and 30 μm or less.

When the particle size $D_{50}$ of the first garnet-type compound and the particle size $D_{50}$ of the second garnet-type compound are 30 μm or less, it can be said that the particles are relatively fine.

In the above configuration, it is preferable to contain a compound containing one or more selected from the element group consisting of Mg, Ca, Ba, Sr, Y, and Sc.

When the ceramic powder material contains a compound containing one or more selected from the element group consisting of Mg, Ca, Ba, Sr, Y, and Sc, grain growth during sintering is suppressed, and a sintered body composed of fine particles is easily obtained.

In the above configuration, any one of the following (a) to (c) is preferable.

(a) A ceramic powder material containing Ga,
in which a sintered body satisfying the following (1) and (2) is obtained from the ceramic powder material by a heat treatment at 950° C.:
(1) the density of the sintered body is 4.6 g/cm$^3$ or more; and
(2) the lithium-ion conductivity at a measurement temperature of 30° C. is 0.1 mS/cm or more.

According to the above configuration, when the ceramic powder material contains Ga, it is possible to obtain a sintered body having a density of 4.6 g/cm$^3$ or more and a lithium-ion conductivity of 0.1 mS/cm or more, which is dense and excellent in lithium-ion conductivity, under a low temperature condition of 950° C.

(b) A ceramic powder material containing Al and not containing Ga,
in which a sintered body satisfying the following (3) and (4) is obtained from the ceramic powder material by a heat treatment at 1,050° C.:
(3) the density of the sintered body is 4.6 g/cm$^3$ or more; and
(4) the lithium-ion conductivity at a measurement temperature of 30° C. is 0.1 mS/cm or more.

According to the above configuration, when the ceramic powder material contains Al and does not contain Ga, it is possible to obtain a sintered body having a density of 4.6 g/cm$^3$ or more and a lithium-ion conductivity of 0.1 mS/cm or more, which is dense and excellent in lithium-ion conductivity, under a low temperature condition of 1,050° C.

(c) A ceramic powder material containing at least one of Nb or Ta, and not containing Al or Ga,
in which a sintered body satisfying the following (5) and (6) is obtained from the ceramic powder material by a heat treatment at 1,140° C.:
(5) the relative density is such that the density of the sintered body is 3.9 g/cm$^3$ or more; and
(6) the lithium-ion conductivity at a measurement temperature of 30° C. is 0.1 mS/cm or more.

According to the above configuration, when the ceramic powder material contains at least one of Nb or Ta and does not contain Al or Ga, it is possible to obtain a sintered body having a density of 3.9 g/cm$^3$ or more and a lithium-ion conductivity of 0.1 mS/cm or more, which is dense and excellent in lithium-ion conductivity, under a low temperature condition of 1,140° C.

The sintered body according to the present invention is obtained by sintering the ceramic powder material.

According to the above configuration, since the sintered body of the present invention is obtained by sintering the ceramic powder material, the sintered body is dense and exhibits excellent lithium-ion conductivity.

The battery according to the present invention includes a sintered body obtained by sintering the ceramic powder material described above.

It is possible to obtain a sintered body that is dense and exhibits excellent lithium-ion conductivity from the ceramic powder material described above under a relatively low temperature condition, and thus a battery (particularly, an all-solid-state lithium-ion secondary battery) including a sintered body obtained by sintering the ceramic powder material is excellent as a battery.

Effect of the Invention

According to the present invention, it is possible to provide a ceramic powder material from which a sintered body that is dense and exhibits excellent lithium-ion conductivity can be obtained under a relatively low temperature condition. It is also possible to provide a sintered body obtained by sintering the ceramic powder material. It is also possible to provide a battery including a sintered body obtained by sintering the ceramic powder material.

MODE FOR CARRYING OUT THE INVENTION

Figure 1:
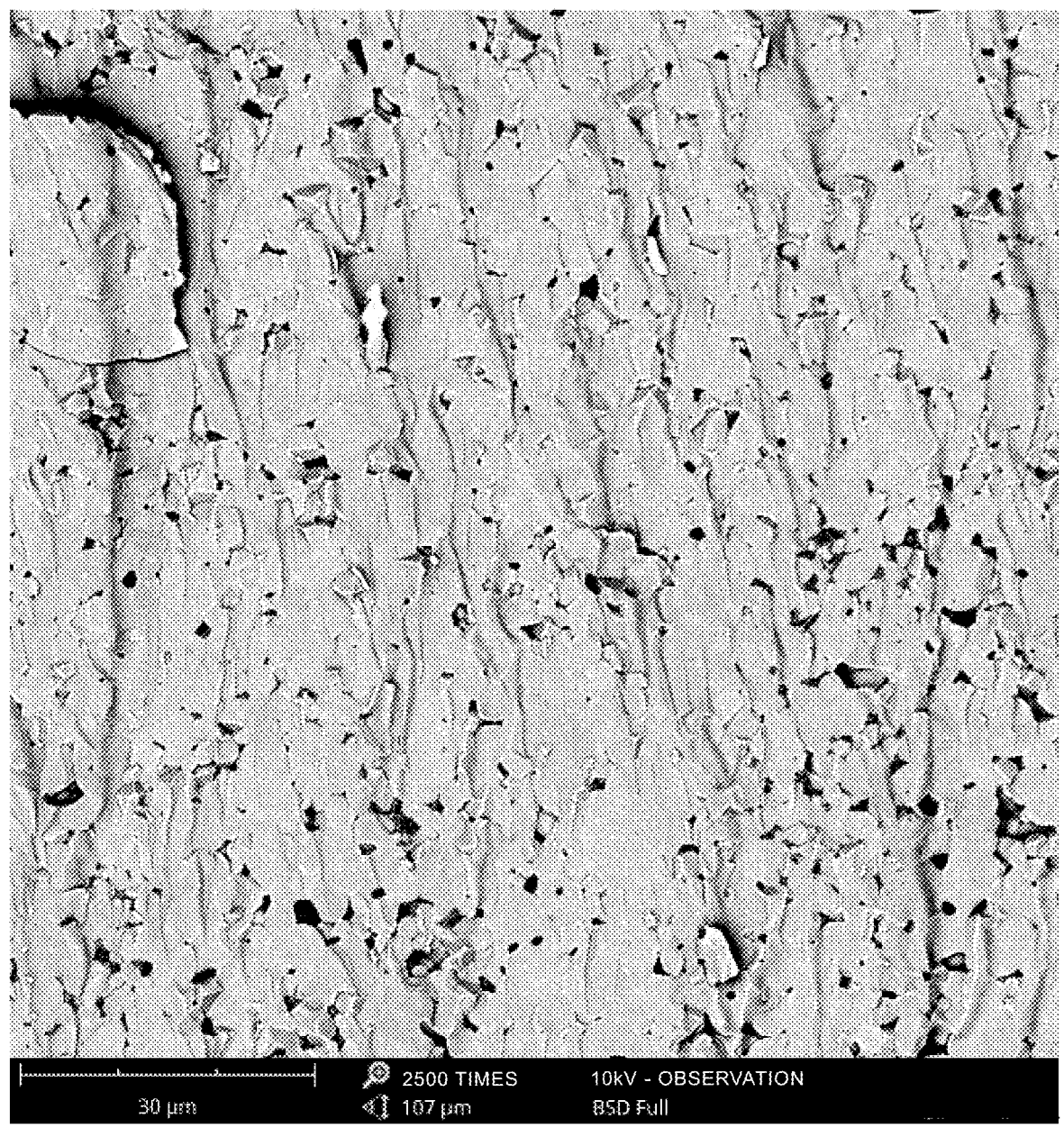
FIG. 1 is an SEM image of a sintered body of Example 1.

Hereinafter, embodiments of the present invention will be described. However, the present invention is not limited only to these embodiments.

The ceramic powder material according to the present embodiment includes:
a first garnet-type compound containing Li, La, and Zr; and
a second garnet-type compound containing Li, La, and Zr and having a composition different from a composition of the first garnet-type compound, in which
the first garnet-type compound and the second garnet-type compound are represented by Formula [1] below:

$$Li_{7-(3x+y)}M1_xLa_3Zr_{2-y}M2_yO_{12} \quad [1]$$

where M1 is Al or Ga, and M2 is Nb or Ta,
the first garnet-type compound satisfies $0 \leq (3x+y) \leq 0.5$, and
the second garnet-type compound satisfies $0.5 < (3x+y) \leq 1.5$.

Hereinafter, first, the first garnet-type compound and the second garnet-type compound contained in the ceramic powder material according to the present embodiment will be described.

The first garnet-type compound contains Li, La, and Zr.

The second garnet-type compound contains Li, La, and Zr. The second garnet-type compound is different in composition from the first garnet-type compound.

The first garnet-type compound and the second garnet-type compound are represented by Formula [1] below:

$$Li_{7-(3x+y)}M1_xLa_3Zr_{2-y}M2_yO_{12} \quad [1]$$

where M1 is Al or Ga, and M2 is Nb or Ta,
the first garnet-type compound satisfies $0 \leq (3x+y) \leq 0.5$, and
the second garnet-type compound satisfies $0.5 < (3x+y) \leq 1.5$.

In the first garnet-type compound, the value of $(3x+y)$ is most preferably 0, but may be more than 0, 0.05 or more, or 0.1 or more from the viewpoint that the Li content can be greatly different from that of the second garnet-type compound. In the first garnet-type compound, the value of $(3x+y)$ is preferably less than 0.5, more preferably 0.4 or less, and still more preferably 0.3 or less from the viewpoint of the Li content.

In the second garnet-type compound, the value of $(3x+y)$ is preferably 0.6 or more, more preferably 0.8 or more, still more preferably 0.9 or more, particularly preferably 1.0 or more, particularly preferably 1.1 or more, and particularly preferably 1.2 or more from the viewpoint that the Li content can be greatly different from that of the second garnet-type compound. In the second garnet-type compound, the value of $(3x+y)$ is preferably less than 1.5, more preferably 1.4 or less, and still more preferably 1.3 or less from the viewpoint of suppressing generation of a resistance component.

The absolute value of the difference between the value of $(3x+y)$ of the first garnet-type compound and the value of $(3x+y)$ of the second garnet-type compound is preferably 0.15 or more and 1.5 or less. The absolute value of the difference is more preferably 0.2 or more, and still more preferably 0.5 or more. The absolute value of the difference is more preferably 1.4 or less, and still more preferably 1.3 or less. When the absolute value of the difference is 0.15 or more and 1.5 or less, the Li concentration gradient of the two types of garnet-type compounds increases during sintering, so that the sinterability is further improved.

In the first garnet-type compound, x is preferably less than 0.15, more preferably 0.1 or less, and still more preferably 0.05 or less.

In the second garnet-type compound, x is preferably 0.17 or more, more preferably 0.2 or more, and still more preferably 0.3 or more. In the second garnet-type compound, x is preferably less than 0.5, more preferably 0.45 or less, and still more preferably 0.4 or less.

In the first garnet-type compound, y is preferably 0.5 or less, more preferably 0.4 or less, and still more preferably 0.3 or less.

In the second garnet-type compound, y is preferably 0, more preferably 0.55 or more, still more preferably 0.6 or more, and particularly preferably 0.65 or more. In the second garnet-type compound, y is preferably 1.4 or less, more preferably 1.2 or less, and still more preferably 1 or less.

The content of the first garnet-type compound is preferably 10% by mass or more and 90% by mass or less when the ceramic powder material is taken as a whole. The content of the first garnet-type compound is more preferably 20% by mass or more, and still more preferably 40% by mass or more. The content of the first garnet-type compound is more preferably 80% by mass or less, and still more preferably 60% by mass or less. When the content of the first garnet-type compound is 10% by mass or more and 90% by mass or less, there are many hetero interfaces between the first garnet-type compound and the second garnet-type compound, so that the sinterability is further improved.

The total content of the content of the first garnet-type compound and the content of the second garnet-type compound is preferably 60% by mass or more, more preferably 70% by mass or more, and still more preferably 80% by mass or more when the ceramic powder material is taken as a whole. The total content is preferably large, but can be, for example, 99.5% by mass or less, 99% by mass or less, or 98% by mass or less when the ceramic powder material is taken as a whole.

When the content of the first garnet-type compound is A and the content of the second garnet-type compound is B, the ratio (B/A) is preferably 0.15 or more and 6.0 or less. The ratio (B/A) is more preferably 0.25 or more, and still more preferably 1 or more. The ratio (B/A) is more preferably 4 or less, and still more preferably 2 or less. When the ratio (B/A) is 0.15 or more and 6.0 or less, there are many hetero interfaces between the first garnet-type compound and the second garnet-type compound. As a result, the sinterability is further improved.

The pore volume of the first garnet-type compound and the pore volume of the second garnet-type compound are preferably 0.4 mL/g or more and 1.0 mL/g or less. The pore volume is more preferably 0.5 mL/g or more, and still more preferably 0.6 mL/g or more. The pore volume is more preferably 0.95 mL/g or less, and still more preferably 0.9 mL/g or less.

When the pore volume of the first garnet-type compound and the pore volume of the second garnet-type compound are 0.4 mL/g or more, it can be said that these compounds contain relatively many voids and are fragile. Such compounds can be easily formed into fine particles without using a strong pulverization method.

A specific method for measuring the pore volume is the method described in Examples.

The pore volume described in the present specification is a value measured by a mercury intrusion method.

The specific surface area of the first garnet-type compound and the specific surface area of the second garnet-type compound are preferably 0.6 m$^2$/g or more and 2.5 m$^2$/g or less. The specific surface area is more preferably 0.7 m$^2$/g or more, and still more preferably 0.8 m$^2$/g or more. The specific surface area is more preferably 2 m$^2$/g or less, and still more preferably 1.5 m$^2$/g or less. When the specific surface area is 0.6 m$^2$/g or more, it can be said that the particles of the ceramic powder material are fine. In the present specification, the specific surface area refers to a BET specific surface area.

A specific method for measuring the specific surface area is the method described in Examples.

The ceramic powder material may contain a compound other than the first garnet-type compound and the second garnet-type compound.

Examples of the other compound include compounds containing one or more selected from the element group consisting of Mg, Ca, Ba, Sr, Y, and Sc. Specific examples thereof include CaO, Ca(OH)$_2$, MgO, Mg(OH)$_2$, BaO, Ba(OH)$_2$, SrO, Sr(OH)$_2$, Y$_2$O$_3$, Y(OH)$_3$, Sc$_2$O$_3$, and Sc(OH)$_3$. When the ceramic powder material contains a compound containing one or more selected from the element group consisting of Mg, Ca, Ba, Sr, Y, and Sc, grain growth during sintering is suppressed, and a sintered body composed of fine particles is easily obtained.

When the other compound is contained in the ceramic powder material, the content of the other compound is preferably 0.1% by mass or more, more preferably 1.0% by mass or more, and still more preferably 2.0% by mass or more when the ceramic powder material is taken as a whole from the viewpoint of suppressing grain growth during sintering. In addition, the total content is preferably 5% by mass or less, more preferably 4% by mass or less, and still more preferably 3% by mass or less when the ceramic powder material is taken as a whole from the viewpoint of ionic conductivity after sintering.

In the ceramic powder material, the number of atoms of Li and the number of atoms of La preferably satisfy Formula [2] below.

$$2.0 \leq [(\text{number of atoms of Li})/(\text{number of atoms of La})] \leq 2.5 \quad [2]$$

The value of [(number of atoms of Li)/(number of atoms of La)] is more preferably 2.05 or more, and still more preferably 2.1 or more. The value of [(number of atoms of Li)/(number of atoms of La)] is more preferably 2.4 or less, and still more preferably 2.3 or less. When the value of [(number of atoms of Li)/(number of atoms of La)] is within the above numerical range, the ionic conductivity can be further increased. Accordingly, it can be suitably used as a constituent member of a battery (in particular, a lithium-ion secondary battery).

In the ceramic powder material, the number of atoms of M1, the number of atoms of M2, and the number of atoms of La preferably satisfy Formula [3] below.

$$0.08 \leq [[3 \times (\text{number of atoms of M1}) + (\text{number of atoms of M2})]/(\text{number of atoms of La})] \leq 0.35 \quad [3]$$

The value of [[3×(number of atoms of M1)+(number of atoms of M2)]/(number of atoms of La)] is more preferably 0.1 or more, and still more preferably 0.2 or more. The value of [[3×(number of atoms of M1)+(number of atoms of M2)]/(number of atoms of La)] is more preferably 0.32 or less, and still more preferably 0.3 or less. When the value of [[3×(number of atoms of M1)+(number of atoms of M2)]/(number of atoms of La)] is within the numerical range, the ionic conductivity can be further increased. Accordingly, it can be suitably used as a constituent member of a battery (in particular, a lithium-ion secondary battery).

The particle size $D_{50}$ (median size) of the first garnet-type compound and the particle size $D_{50}$ of the second garnet-type compound are preferably 0.5 µm or more and 30 µm or less. The particle size $D_{50}$ is preferably 1.0 µm or more, and more preferably 2.0 µm or more. The particle size $D_{50}$ is preferably 25 µm or less, and more preferably 20 µm or less. When the particle size $D_{50}$ is 30 µm or less, it can be said that the particles are relatively fine.

A specific method for measuring the particle size $D_{50}$ is the method described in Examples. The particle size $D_{50}$ described in the present specification is a value measured on a volume basis.

The ceramic powder material is preferably any one of the following (a) to (c):

(a) A ceramic powder material containing Ga,
in which a sintered body satisfying the following (1) and (2) is obtained from the ceramic powder material by a heat treatment at 950° C.:
(1) the density of the sintered body is 4.6 g/cm$^3$ or more; and
(2) the lithium-ion conductivity at a measurement temperature of 30° C. is 0.1 mS/cm or more.

The density of the sintered body is more preferably 4.7 g/cm³ or more, and still more preferably 4.8 g/cm³ or more. The relative density is preferably as large as possible, and is, for example, 5.4 g/cm³ or less, 5.5 g/cm³ or less, or the like.

The lithium-ion conductivity is more preferably 0.3 mS/cm or more, and still more preferably 0.6 mS/cm or more. The lithium-ion conductivity is preferably as high as possible, and is, for example, 3 mS/cm or less, 2 mS/cm or less, or the like.

In the case of (a), it is possible to obtain a sintered body having a relative density of 90% or more and a lithium-ion conductivity of 0.1 mS/cm or more, which is dense and excellent in lithium-ion conductivity, under a low temperature condition of 950° C.

(b) A ceramic powder material containing Al and not containing Ga, in which a sintered body satisfying the following (3) and (4) is obtained from the ceramic powder material by a heat treatment at 1,050° C.:

(3) the density of the sintered body is 4.6 g/cm³ or more; and
(4) the lithium-ion conductivity at a measurement temperature of 30° C. is 0.1 mS/cm or more.

The density of the sintered body is more preferably 4.7 g/cm³ or more, and still more preferably 4.8 g/cm³ or more. The relative density is preferably as large as possible, and is, for example, 5.5 g/cm³ or less, 5.4 g/cm³ or less, or the like.

The lithium-ion conductivity is more preferably 0.2 mS/cm or more, and still more preferably 0.4 mS/cm or more. The lithium-ion conductivity is preferably as high as possible, and is, for example, 3 mS/cm or less, 2 mS/cm or less, or the like.

In the case of (b), it is possible to obtain a sintered body having a relative density of 90% or more and a lithium-ion conductivity of 0.1 mS/cm or more, which is dense and excellent in lithium-ion conductivity, under a low temperature condition of 1,050° C.

(c) A ceramic powder material containing at least one of Nb or Ta, and not containing Al or Ga, in which a sintered body satisfying the following (5) and (6) is obtained from the ceramic powder material by a heat treatment at 1,140° C.:

(5) the density of the sintered body is 3.9 g/cm³ or more; and
(6) the lithium-ion conductivity at a measurement temperature of 30° C. is 0.1 mS/cm or more.

The density of the sintered body is more preferably 4.0 g/cm³ or more, and still more preferably 4.1 g/cm³ or more. The relative density is preferably as large as possible, and is, for example, 5.5 g/cm³ or less, 5.4 g/cm³ or less, or the like.

The lithium-ion conductivity is more preferably 0.2 mS/cm or more, and still more preferably 0.5 mS/cm or more. The lithium-ion conductivity is preferably as high as possible, and is, for example, 3 mS/cm or less, 2 mS/cm or less, or the like.

In the case of (c), it is possible to obtain a sintered body having a density of 3.9 g/cm³ or more and a lithium-ion conductivity of 0.1 mS/cm or more, which is dense and excellent in lithium-ion conductivity, under a low temperature condition of 1,140° C. in spite of containing at least one of Nb or Ta and not containing Al or Ga.

A specific method for measuring the relative density and the lithium-ion conductivity is the method described in Examples.

As described above, since the ceramic powder material according to the present embodiment contains two types of garnet-type compounds having different amounts of Li, that is, the first garnet-type compound and the second garnet-type compound, it is possible to obtain a sintered body that is dense and exhibits excellent lithium-ion conductivity under a relatively low temperature condition.

[Method for Producing Ceramic Powder Material]

Hereinafter, an example of a method for producing a ceramic powder material will be described. However, the method for producing a ceramic powder material of the present invention is not limited to the following example.

The method for producing a ceramic powder material according to the present embodiment includes:

a step X of mixing a first garnet-type compound and a second garnet-type compound.

The mixing method in the step X is not particularly limited, and a conventionally known mixer may be used.

In the step X, the first garnet-type compound and the second garnet-type compound may be mixed and simultaneously pulverized. In the step X, the mixture may be pulverized after mixing the first garnet-type compound and the second garnet-type compound. In the step X, the first garnet-type compound and the second garnet-type compound may be separately pulverized and then mixed.

When a compound other than the first garnet-type compound and the second garnet-type compound is contained in the ceramic powder material, the mixing timing of the other compound is not particularly limited. That is, the order of mixing the first garnet-type compound, the second garnet-type compound, and the other compound is not particularly limited. The timing of pulverization is also not particularly limited. Each component may be mixed after being pulverized, or may be pulverized after being mixed.

However, the pore volume in the resulting ceramic powder material is equivalent regardless of whether it is pulverized or not. That is, the pulverization is not essential.

Next, a method for producing a first garnet-type compound will be described.

The method for producing a first garnet-type compound according to the present embodiment is a method for producing a first garnet-type compound represented by Formula [1] below:

$$Li_{7-(3x+y)}M1_xLa_3Zr_{2-y}M2_yO_{12} \qquad [1]$$

where M1 is Al or Ga, M2 is Nb or Ta, and $0 \leq (3x+y) \leq 0.5$ is satisfied, the method including:

a first step of mixing a solution of a carbonic acid species with a solution containing a compound having La as a constituent element to obtain a solution containing a precipitate A;

a second step of mixing a solution containing a zirconium carbonate complex with a solution containing the precipitate A to obtain a precipitate B;

a third step of calcining the precipitate B at a temperature of 500° C. or more and 900° C. or less to obtain a precursor oxide;

a fourth step of preparing a mixture obtained by mixing the precursor oxide and a compound containing Li as a constituent element; and a fifth step of calcining the mixture at a temperature of 500° C. or more and 900° C. or less to obtain a garnet-type compound.

<First Step>

In the method for producing a first garnet-type compound according to the present embodiment, first, a solution of a carbonic acid species and a solution containing a compound having La as a constituent element are mixed to obtain a precipitate (hereinafter, also referred to as "lanthanum carbonate compound") which is a carbonate of La.

The carbonic acid species refers to at least one of carbonic acid ($H_2CO_3$), hydrogencarbonate ion ($HCO_3^-$), or carbonate ion ($CO_3^{2-}$).

Examples of the solution of a carbonic acid species include a solution of a compound containing a carbonic acid species. Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

Examples of the compound (hereinafter, also referred to as "La source") containing La as a constituent element include a water-soluble salt of La element. Examples of the water-soluble salt of La element include lanthanum nitrate, lanthanum acetate, lanthanum chloride, and hydrates thereof. The compounds exemplified above can be used singly or in combination of arbitrary two or more thereof and dissolved in pure water or the like to obtain an aqueous solution in which a La source is dissolved.

The La source may be in a solid state or in a solution state. In a case where the La source is in the form of a solution, the solvent of the La source may be water alone or a mixed solvent of water and an organic solvent such as an alcohol, but is preferably water alone from the viewpoint of not using an organic solvent in the entire production. In other words, the La source is preferably an aqueous solution in a case where the La source is in the form of a solution.

When the La source is dissolved in water, the pH of the aqueous solution may be adjusted using an acid such as nitric acid or hydrochloric acid.

In the first step, a compound (hereinafter, also referred to as "compound containing element $M^o$ as a constituent element" or "$M^o$ source") containing one or more elements selected from the group consisting of aluminum, gallium, yttrium, cerium, calcium, barium, strontium, niobium, and tantalum as a constituent element may be mixed.

From the viewpoint of increasing the ionic conductivity, the $M^o$ source is preferably a compound containing Nb as a constituent element, a compound containing Ta as a constituent element, a compound containing Al as a constituent element, or a compound containing Ga as a constituent element.

Examples of the $M^o$ source include water-soluble salts of the element $M^o$. Examples of the water-soluble salt of the element $M^o$ include nitrates, acetates, chlorides, oxides, hydroxides, oxalates, and ammonium salts of the element $M^o$. The compounds exemplified above can be used singly or in combination of arbitrary two or more thereof and dissolved in pure water or the like to obtain an aqueous solution in which an $M^o$ source is dissolved.

In a case where the La source is in the form of a solution, the $M^o$ source may be dissolved in the solution of the La source.

In a case where the $M^o$ source is dissolved in the solution of the carbonic acid species, the $M^o$ source may be dissolved in advance in the solution of the carbonic acid species and then mixed with a La source or the like.

The first step has been described above.

<Second Step>

In the second step, a solution containing a zirconium carbonate complex is mixed with a solution containing the precipitate A (lanthanum carbonate compound) to obtain a precipitate B. This makes it possible to uniformly coat the surface of the precipitate (lanthanum carbonate compound) with a Zr component.

The solution containing a zirconium carbonate complex can be prepared by mixing at least a compound containing a carbonic acid species and a compound containing a zirconium species (Zr species).

Examples of the compound containing a carbonic acid species include ammonium hydrogencarbonate, lithium hydrogencarbonate, tetramethylammonium hydrogencarbonate, ammonium carbonate, and carbonic acid gas. Any one of these can be used singly or these can be used in combination of arbitrary two or more thereof.

The Zr species means zirconium or a zirconium ion. Hereinafter, the compound containing a Zr species is also referred to as "Zr source".

Specific examples of the Zr source include crystals of ammonium zirconium carbonate (($NH_4)_3Zr(OH)(CO_3)_3 \cdot 2H_2O$), basic zirconium carbonate ($Zr(OH)_{(4-2n)}(CO_3)_n \cdot mH_2O$, n=0.2 to 1.0, m=1 to 10), zirconium oxychloride ($ZrOCl_2$), or zirconium oxynitrate ($ZrO(NO_3)_2$), but the Zr source is not limited thereto. Any one of these Zr sources can be used singly or these Zr sources can be used in combination of arbitrary two or more thereof. When the Zr source is the above-described zirconium oxychloride, zirconium oxynitrate and the like, hydrates thereof may be used.

The solution containing a zirconium carbonate complex can also be prepared using a compound containing both a carbonic acid species and a Zr species. Examples of the compound containing both a carbonic acid species and a Zr species as used herein include the above-described crystals of ammonium zirconium carbonate (($NH_4)_3Zr(OH)(CO_3)_3 \cdot 2H_2O$) and basic zirconium carbonate ($Zr(OH)_{(4-2n)}(CO_3)_n \cdot mH_2O$, n=0.2 to 1.0, m=1 to 10). Such a compound containing both a carbonic acid species and a Zr species can be handled as a compound containing a carbonic acid species as well as a Zr source.

In preparation of the solution containing a zirconium carbonate complex, it is preferable to mix the compound containing a carbonic acid species with the Zr source so that the molar ratio of the carbonic acid species to the zirconium species, namely, the value of [number of moles of carbonic acid species/number of moles of zirconium species] is in a range of 1.5 or more and 15.0 or less. This mixing may be performed by mixing the two in a solid state as they are and then dispersing the mixture in a solvent or by a method in which solutions of the two are mixed together. In the case of preparing the solution containing a zirconium carbonate complex using a compound containing both a carbonic acid species and a Zr species, the solution containing a zirconium carbonate complex can be prepared by dissolving this compound in a solvent. In this case, the type of the compound containing both a carbonic acid species and a Zr species may be selected so that the value of the molar ratio [number of moles of carbonic acid species/number of moles of zirconium species] is in a range of 1.5 or more and 15.0 or less, preferably 2.0 or more and 14.0 or less.

Here, the molar ratio, [number of moles of carbonic acid species/number of moles of zirconium species] is defined in more detail as the value (number of moles of carbonic acid species/number of moles of zirconium species) obtained by dividing the number of moles of carbonic acid species contained in all the raw materials used to prepare the solution of a zirconium carbonate complex by the number of moles of Zr element contained in the Zr source. It is taken into consideration that carbonic acid species and $NR_4^+$ species to be described later may slightly volatilize from the finally prepared aqueous solution to cause a change in concentration. In a case where crystals of ammonium zirconium carbonate or basic zirconium carbonate are used as the Zr source, the number of moles of carbonic acid species contained therein is also taken into consideration when the molar ratio is calculated.

When a compound containing a carbonic acid species and a Zr source are mixed in the above molar ratio range, the carbonic acid species coordinates the zirconium (IV) ion. For example, in a case where the carbonic acid species is $CO_3^{2-}$, it is considered that a Zr monomeric complex ion $[Zr(CO_3)_n]^{(2n-4)-}$ $\{9 \geq n \geq 4\}$, a Zr dimeric complex ion $[Zr_2(OH)_2(CO_3)_6]^{6-}$ and the like are formed. A solution containing a zirconium carbonate complex is thus obtained. In the case of using a compound containing both a carbonic acid species and a Zr species as well, a solution containing a zirconium carbonate complex is obtained by forming the above-described complex ions. The formation of the zirconium carbonate complex ion can be confirmed by analyzing information on the coordination number, coordination distance, and local structure obtained by extended X-ray absorption fine structure (EXAFS) measurement, Raman spectroscopy, nuclear magnetic resonance (NMR) measurement and the like.

The molar ratio [number of moles of carbonic acid species/number of moles of zirconium species] is more preferably 3.0 or more and 7.0 or less, and a more stable zirconium carbonate complex is formed in this case.

In the solution containing a zirconium carbonate complex, at least one of the counter cations of the zirconium carbonate complex ion is set to $NR_4^+$. Here, R is at least one or more substituents selected from the group consisting of H, $CH_3$, and $CH_2CH_2OH$, Rs may be all the same as one another or all or some of Rs may be different from one another. Coexistence with $NR_4^+$ cation allows zirconium carbonate complex ion to more stably exist in the solution. Specific examples of $NR_4^+$ include ammonium ion ($NH_4^+$), tetramethylammonium ion (($CH_3)_4N^+$), and 2-hydroxyethyltrimethylammonium ion (($CH_3)_3N(CH_2CH_2OH)+$), but $NR_4^+$ is not limited thereto. Among these, ammonium ion ($NH_4^+$) is preferable as $NR_4^+$ from the viewpoint of low price of the raw material. In order to set $NR_4^+$ as the counter cation of the zirconium carbonate complex ion, for example, a material capable of providing $NR_4^+$ to the solution may be added when the solution containing a zirconium carbonate complex ion is prepared. Examples of the material capable of providing $NR_4^+$ to the solution include ammonium hydroxide ($NH_4OH$, ammonia water), tetramethylammonium hydroxide (($CH_3)_4N(OH)$), and choline hydroxide (($CH_3)_3N(CH_2CH_2OH)$ $(OH)$), but the material capable of providing $NR_4^+$ to the solution is not limited thereto. These can be used singly or in combination of arbitrary two or more thereof. As the material capable of providing $NR_4^+$ to the solution, any one or more of ammonium hydrogencarbonate, tetramethylammonium hydrogencarbonate, ammonium carbonate or the like may be used concurrently.

In preparation of the solution containing a zirconium carbonate complex, compounds other than the compound containing a carbonic acid species and the Zr source, for example, a chelating agent may be added as long as the formation of the zirconium carbonate complex is not inhibited. The existence of chelating agent improves the stability of the aqueous solution of zirconium carbonate complex and can suppress the consumption of Zr due to autohydrolysis. Examples of the chelating agent include ethanolamines such as monoethanolamine, diethanolamine, and triethanolamine and organic acids such as tartaric acid, citric acid, lactic acid, gluconic acid, and glycolic acid or salts of ethanolamines and salts of organic acids. These can be used singly or two or more thereof can be used concurrently. The molar ratio (chelating agent/Zr) of the chelating agent to zirconium can be set to 0.01 to 1.

The pH of the solution containing a zirconium carbonate complex is preferably 7.0 or more and 9.5 or less. When the pH is 7.0 or more, the solution containing a zirconium carbonate complex can efficiently form a precipitate with an acidic aqueous solution. When the pH is 9.5 or less, the concentration of free hydroxide ions existing in the solution of a zirconium carbonate complex is sufficiently low and the generation of precipitate as a hydroxide can be suppressed. The pH can be adjusted by the blending ratio of various raw materials for preparation of the solution of a zirconium carbonate complex and the amount of solvent, and the pH may be adjusted by addition of a pH adjusting agent and the like.

In the second step, it is preferable to adjust the pH of the solution containing the precipitate B to fall within a range of 9.0 or more and 11.0 or less after preparing the precipitate B. For adjustment of the pH, ammonia water, an aqueous sodium hydroxide solution, or the like can be used. When the pH is 9.0 or more, elution of Zr can be further suppressed. When the pH is 11.0 or less, elution of La can be further suppressed. The pH can be adjusted by the blending ratio of various raw materials for preparation of the solution containing the precipitate B and the amount of solvent, and the pH may be adjusted by addition of ammonia water, or the like.

In the second step, after the precipitate B is prepared and the pH thereof is adjusted as necessary, heating may be performed at a temperature in a range of 90 to 200° C. The heating time is preferably 30 to 60 minutes. The yield of Zr can be improved by performing the heating.

Thereafter, the obtained slurry containing the precipitate B is suction-filtered, the filtered substance is washed with pure water or the like, and moisture is removed to separate the precipitate B from the slurry.

<Third Step>

In the third step, the precipitate B is calcined at a temperature of 500° C. or more and 900° C. or less to obtain a precursor oxide.

<Fourth Step>

In the fourth step, a mixture obtained by mixing the precursor oxide and a compound containing Li as a constituent element is prepared.

At the time of mixing, the mixture may be pulverized. However, the pore volume in the obtained first garnet-type compound is equivalent regardless of whether the mixture is pulverized or not. That is, the pulverization of the mixture is not essential.

Examples of the compound containing Li as a constituent element (hereinafter, also referred to as "Li source") include lithium oxide, lithium hydroxide, lithium chloride, lithium carbonate, lithium hydrogencarbonate, lithium nitrate, lithium sulfate, lithium acetate, lithium citrate ($Li_3C_6H_5O_7$), and lithium oxalate ($Li_2(COO)_2$), but the compound containing Li as a constituent element is not limited thereto. In the case of using various Li salts exemplified above as the Li source, the Li source may be hydrates thereof.

<Fifth Step>

In the fifth step, the mixture is calcined at a temperature of 500° C. or more and 900° C. or less to obtain a garnet compound. Calcination can be performed in an air atmosphere, for example. The calcination temperature is preferably 600° C. or more, and more preferably 700° C. or more. The calcination temperature is preferably 900° C. or less, and more preferably 850° C. or less. The resulting calcined product is a first garnet-type compound. Then, the first garnet-type compound to be obtained can be in the form of particles by performing calcination at a temperature of 900° C. or less. It can be confirmed that the first garnet-type compound which is the calcined product obtained is in the form of particles by scanning electron microscopy.

The first garnet-type compound includes a garnet-type compound produced from a precursor oxide with reduced grain growth and aggregations having a size of about 5 to 15 μm, and thus can achieve a pore volume of 0.4 mL/g or more.

Examples of the method for obtaining the precursor oxide having aggregations with a size of about 5 to 15 μm include a method in which the precipitate A (lanthanum salt) forming the skeleton of the precursor oxide is coarsened to some extent in the first step.

Specifically, in the first step, the speed at the time of adding the La source to the solution of the carbonic acid species is increased, the stirring speed is reduced, the concentration of the La source solution is increased, the temperature at the time of charging the La source is increased, the concentration on the basic solution side is increased, and the like.

More specifically, the speed at the time of adding the La source is set to 5 to 10 g/min with respect to 100 mL of the solution of the carbonic acid species, the concentration of the La source solution is set to 10 to 20% by mass, the temperature at the time of charging the La source is set to 40 to 90° C., the concentration on the basic solution side is set to 10 to 20% by mass, and the like.

Examples of the method for obtaining the precursor oxide in which the grain growth is suppressed include a method in which the surface of the precipitate A (lanthanum salt) is uniformly coated with Zr element in the second step. In order to uniformly coat the surface of the precipitate A (lanthanum salt) with the Zr element, relatively gentle conditions are preferable.

Specifically, in the second step, the timing of adding a solution containing a zirconium carbonate complex to the precipitate A, the temperature at the time of addition, the temperature rise at the time of addition, aging, pH adjustment, and the like are exemplified.

More specifically, the temperature at the time of adding the solution containing the zirconium carbonate complex to the precipitate A is set to 40 to 90° C., the aging time after the temperature rise is set to 30 to 180 minutes, the pH is set in a range of 9 to 11, and the like.

An example of the method for producing a first garnet-type compound has been described above.

Next, a method for producing a second garnet-type compound will be described.

The method for producing a second garnet-type compound according to the present embodiment is a method for producing a second garnet-type compound represented by Formula [1] below:

$$Li_{7-(3x+y)}M1_xLa_3Zr_{2-y}M2_yO_{12}$$ [1]

where M1 is Al or Ga, M2 is Nb or Ta, and $0.5<(3x+y) \leq 1.5$ is satisfied, the method including:
a first step of mixing a solution of a carbonic acid species with a compound containing La as a constituent element to obtain a solution containing a precipitate A;
a second step of mixing a solution containing a zirconium carbonate complex with a solution containing the precipitate A to obtain a precipitate B;
a third step of calcining the precipitate B at a temperature of 500° C. or more and 900° C. or less to obtain a precursor oxide;
a fourth step of preparing a mixture obtained by mixing the precursor oxide and a compound containing Li as a constituent element; and
a fifth step of calcining the mixture at a temperature of 500° C. or more and 900° C. or less to obtain a garnet-type compound.

The method for producing a second garnet-type compound according to the present embodiment is the same as the method for producing a first garnet-type compound except that the amount of the compound added in each step is different from that of the method for producing a first garnet-type compound.

Specifically, in the method for producing a first garnet-type compound, the amount of the compound to be added in each step is adjusted so that x and y in Formula [1] satisfy $0 \leq (3x+y) \leq 0.5$. On the other hand, in the method for producing a second garnet-type compound, the amount of the compound to be added in each step is adjusted so that x and y in Formula [1] satisfy $0.5 < (3x+y) \leq 1.5$.

An example of the method for producing a second garnet-type compound has been described above.

[Molded Body]

The molded body according to the present embodiment is obtained by crushing the ceramic powder material as necessary and then pressurizing the resulting material. In a case where the first garnet-type compound and the second garnet-type compound are pulverized at the time of producing the ceramic powder material (specifically, in step X), the ceramic powder material need not be crushed. The first garnet-type compound and the second garnet-type compound can be easily crushed when the pore volume thereof is 0.4 mL/g or more and 1.0 mL/g or less. Thus, a molded body obtained by pressurizing such a ceramic powder material becomes a denser molded body.

The molding pressure is not particularly limited, and may be 0.5 t/cm² or more and 5 t/cm² or less, 0.8 t/cm² or more and 2 t/cm² or less, or the like.

When the ceramic powder material is molded, a commercially available molding machine or a cold isostatic pressing method (CIP) can be adopted. Molding may be performed by temporarily molding the ceramic powder material after crushing by a molding machine and then performing main-molding by press molding such as CIP.

In the production of the molded body, before the ceramic powder material is pressurized, a binder may be added as necessary to improve moldability.

The binder is preferably an organic binder. The organic binder is likely to be removed from the molded body in a heating furnace in an oxidizing atmosphere, and a degreased body can be obtained, whereby finally, impurities are less likely to remain in the sintered body.

Examples of the organic binder include those that are soluble in alcohol, or those that are soluble in mixed solutions of two or more selected from the group consisting of alcohols, water, aliphatic ketones, and aromatic hydrocarbons. Examples of the organic binder include at least one selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed solutions.

[Sintered Body]

The sintered body according to the present embodiment is obtained by sintering the ceramic powder material (the molded body) described above. The heat treatment temperature and time during the sintering are not particularly limited, but since the ceramic powder material is used, the lower limit of the sintering temperature can be lowered. For example, the sintering temperature can be set to a low temperature of 900 to 1,150° C. The sintering temperature is more preferably 1,050° C. or less, and still more preferably 1,000° C. or less. The sintering temperature is more preferably 930° C. or more, and still more preferably 950° C. or more.

The density of the sintered body is preferably 3.9 g/cm$^3$ or more.

In particular, when the sintered body contains Ga, the density of the sintered body is preferably 4.6 g/cm$^3$, more preferably 4.7 g/cm$^3$ or more, and still more preferably 4.8 g/cm$^3$ or more.

When the sintered body contains Al and does not contain Ga, the density of the sintered body is preferably 4.6 g/cm$^3$ or more, more preferably 4.7 g/cm$^3$ or more, and still more preferably 4.8 g/cm$^3$ or more.

When the sintered body contains at least one of Nb or Ta and does not contain Al or Ga, the density of the sintered body is preferably 3.9 g/cm$^3$ or more, more preferably 4.0 g/cm$^3$% or more, and still more preferably 4.1 g/cm$^3$% or more.

The density of the sintered body is preferably as high as possible, and is, for example, 5.5 g/cm$^3$% or less, 5.4 g/cm$^3$ or less, or the like.

The lithium-ion conductivity of the sintered body at a measurement temperature of 30° C. is preferably 0.1 mS/cm or more.

In particular, when the sintered body contains Ga, the lithium-ion conductivity of the sintered body is preferably 0.3 mS/cm or more, more preferably 0.6 mS/cm or more, and still more preferably 1.0 mS/cm or more.

When the sintered body contains Al and does not contain Ga, the lithium-ion conductivity of the sintered body is preferably 0.2 mS/cm or more, more preferably 0.4 mS/cm or more, and still more preferably 0.5 mS/cm or more.

When the sintered body contains at least one of Nb or Ta and does not contain Al or Ga, the lithium-ion conductivity of the sintered body is preferably 0.2 mS/cm or more, more preferably 0.5 mS/cm or more, and still more preferably 1.0 mS/cm or more.

The lithium-ion conductivity of the sintered body is preferably as high as possible, and is, for example, 3.0 mS/cm or less, 2.0 mS/cm or less, or the like.

The activation energy (Ea) of lithium-ion conduction of the sintered body is preferably 40 kJ/mol or less.

In particular, when the sintered body contains Ga, the Ea is preferably 30 kJ/mol or less, more preferably 25 kJ/mol or less, and still more preferably 20 kJ/mol or less.

When the sintered body contains Al and does not contain Ga, the Ea of the sintered body is preferably 30 kJ/mol or less, more preferably 25 kJ/mol or less, and still more preferably 20 kJ/mol or less.

When the sintered body contains at least one of Nb or Ta and does not contain Al or Ga, the Ea of the sintered body is preferably 35 kJ/mol or less, more preferably 30 kJ/mol or less, and still more preferably 25 kJ/mol or less.

The Ea of the sintered body is preferably as low as possible, but is, for example, 10 kJ/mol or more, 15 kJ/mol or more, or the like.

[All-Solid-State Lithium-Ion Secondary Battery]

Next, an example of the embodiment of an all-solid-state lithium-ion secondary battery will be described.

The all-solid-state lithium-ion secondary battery of the present embodiment includes:

a positive electrode layer containing a positive electrode active material;

a negative electrode layer containing a negative electrode active material; and a solid electrolyte layer interposed between the positive electrode layer and the negative electrode layer.

At least one of the positive electrode layer, the negative electrode layer, or the solid electrolyte layer includes the sintered body.

Hereinafter, the all-solid-state lithium-ion secondary battery of the present embodiment will be described for every configuration.

(Positive Electrode Layer)

The positive electrode layer is a layer containing at least a positive electrode active material and may further contain at least one of a lithium-ion conductive material, an electron conduction auxiliary, or a binder if necessary.

The lithium-ion conductive material contained in the positive electrode layer is preferably a sintered body obtained by sintering the ceramic powder material described above. The content of the sintered body in the positive electrode layer is not particularly limited but can be, for example, in a range of 0.1% by volume to 80% by volume with respect to the entire volume of the positive electrode layer. Among these, the content is preferably in a range of 1% by volume to 60% by volume, and more preferably in a range of 10% by volume to 50% by volume. The thickness of the positive electrode layer is not particularly limited but is preferably in a range of, for example, 0.1 μm to 1,000 μm. It is difficult to increase the capacity of the all-solid-state lithium-ion secondary battery when the positive electrode layer is thinner than 0.1 μm, and it is difficult to form a homogeneous layer when the positive electrode layer has a thickness exceeding 1,000 μm.

The positive electrode active material is not particularly limited as long as it is a material capable of storing and releasing electrochemical Li ions, but it is preferable to use sulfur or lithium sulfide (Li$_2$S) having a large theoretical capacity from the viewpoint of increasing the capacity of the all-solid-state lithium-ion secondary battery. A Li-containing oxide material may be used from the viewpoint of increasing the operating voltage of the all-solid-state lithium-ion secondary battery. Specifically, it is possible to use layered rock salt-type oxides such as LiCoO$_2$, LiMnO$_2$, LiNiO$_2$, LiVO$_2$, Li(Ni$_x$Co$_y$Mn$_z$)O$_2$ (x+y+z=1), and Li(Ni$_x$Co$_y$Al$_z$)O$_2$ (x+y+z=1), spinel-type oxides such as LiMn$_2$O$_4$ and Li(Ni$_{0.5}$Mn$_{1.5}$)O$_4$, olivin-type phosphates such as LiFePO$_4$, LiMnPO$_4$, LiNiPO$_4$, and LiCuPO$_4$, and silicates such as Li$_2$FeSiO$_4$ and Li$_2$MnSiO$_4$. As the positive electrode active material, the above-described materials may be used singly or in combination of arbitrary two or more thereof.

The content of the positive electrode active material in the positive electrode layer is preferably in a range of, for example, 10% by volume to 99% by volume with respect to the entire volume of the positive electrode layer. The content is more preferably in a range of 20% by volume to 99% by volume. The shape of the positive electrode active material can be, for example, a particle shape. The average particle size thereof is preferably in a range of, for example, 0.05 μm to 50 μm.

The positive electrode layer may further contain at least one of an electron conduction auxiliary or a binder in addition to the positive electrode active material and the lithium-ion conductive material. As the electron conduction auxiliary, a material exhibiting high electron conductivity is preferable, and examples thereof include acetylene black, ketjen black, and carbon fibers. As the binder, for example, polyvinylidene fluoride, polytetrafluoroethylene, polyvinyl alcohol, polyvinyl acetate, polymethylmethacrylate, and polyethylene can be used.

The positive electrode layer can be fabricated by mixing the components (the above-described positive electrode active material, lithium-ion conductive material, electron conduction auxiliary, binder and the like) and molding the mixture. At this time, sintering may be performed if necessary. The method for mixing the components of the positive electrode layer is not particularly limited, and any general powder technique can be used. At this time, water or arbitrary organic solvents may be used as the dispersion solvent. The method for molding and sintering the mixture of the components of the positive electrode layer is not particularly limited, and generally known molding and sintering methods can be used. The positive electrode layer may be fabricated on the solid electrolyte layer. In this case, sintering of the positive electrode layer can be performed in the form of integral sintering with the solid electrolyte layer. Here, integral sintering is a method in which one of the "lithium-ion conductive material constituting the solid electrolyte layer" or the "mixture of the components of the positive electrode layer" is molded, the other is molded thereon, pressing is performed if necessary, and then sintering is performed.

The positive electrode current collector for collecting electrical power of the positive electrode layer can be provided, for example, on the surface on the opposite side to the surface on which the solid electrolyte layer is disposed of the positive electrode layer. Examples of the material for the positive electrode current collector include stainless steel, aluminum, nickel, iron, and carbon. Among these, stainless steel is preferable.

(Negative Electrode Layer)

The negative electrode layer is a layer containing at least a negative electrode active material and may further contain at least one of a lithium-ion conductive material, an electron conduction auxiliary, or a binder if necessary.

The lithium-ion conductive material contained in the negative electrode layer is preferably the sintered body described above (a sintered body obtained by sintering the ceramic powder material described above). The content of the sintered body in the negative electrode layer is not particularly limited but can be, for example, in a range of 0.1% by volume to 80% by volume with respect to the entire volume of the negative electrode layer. Among these, the content is preferably in a range of 1% by volume to 60% by volume, and more preferably in a range of 10% by volume to 50% by volume. The thickness of the negative electrode layer is not particularly limited, but is preferably in a range of, for example, 0.1 µm to 1,000 µm.

The negative electrode active material is not particularly limited as long as it is a material capable of storing and releasing electrochemical Li ions, but it is preferable to use a metal material having a large theoretical capacity from the viewpoint of increasing the capacity of the all-solid-state lithium-ion secondary battery. Examples of the metal material include metals such as Li, Si, Sn, and In and alloys thereof. Among these, metal Li has the largest theoretical capacity and is thus preferable. Ti-based materials such as titanium oxide and lithium titanate that are excellent in reversible operation of the battery may be used. Specific examples of Ti-based materials include $TiO_2$, $H_2Ti_{12}O_{25}$, and $Li_4Ti_5O_{12}$. Inexpensive carbon-based materials can also be used. Specific examples of the carbon-based materials include natural graphite, artificial graphite, non-graphitizable carbon, and graphitizable carbon. As the negative electrode active material, the above-described materials may be used singly or in combination of arbitrary two or more thereof.

The content of the negative electrode active material in the negative electrode layer is preferably in a range of, for example, 10% by volume to 99% by volume with respect to the entire volume of the negative electrode layer. The content is more preferably in a range of 20% by volume to 99% by volume. The shape of the negative electrode active material can be, for example, a particle shape, a foil shape, or a film shape. In a case where the shape of the negative electrode active material is a particle shape, the average particle size thereof is preferably in a range of, for example, 0.05 µm to 50 µm.

The negative electrode layer may further contain at least one of an electron conduction auxiliary or a binder in addition to the negative electrode active material and the lithium-ion conductive material. As the electron conduction auxiliary and the binder, those used in the positive electrode layer described above can be used in the same manner.

The negative electrode layer can be fabricated by mixing the components (the above-described negative electrode active material, lithium-ion conductive material, electron conduction auxiliary, binder and the like) and molding the mixture. At this time, sintering may be performed if necessary. The method for mixing the components of the negative electrode layer is not particularly limited, and any general powder process can be used. At this time, water or arbitrary organic solvents may be used as the dispersion solvent. The method for molding and sintering the mixture of the components of the negative electrode layer is not particularly limited, and generally known molding and sintering methods can be used. In a case where the shape of the negative electrode active material is a foil shape, a film shape, or the like, the negative electrode layer may be formed by the method for forming the negative electrode layer described above, but the negative electrode active material itself may be regarded as the negative electrode layer by itself. The negative electrode layer may be fabricated on the solid electrolyte layer. In this case, sintering of the negative electrode layer can be performed in the form of integral sintering with the solid electrolyte layer. Here, integral sintering is a method in which one of the "lithium-ion conductive material constituting the solid electrolyte layer to be described later" or the "mixture of the components of the negative electrode layer" is first molded, the other is molded thereon, and then sintering is performed.

The negative electrode current collector for collecting electrical power of the negative electrode layer can be provided, for example, on the surface on the opposite side to the surface on which the solid electrolyte layer is disposed of the negative electrode layer. Examples of the material for the negative electrode current collector include stainless steel, copper, nickel, and carbon. Among these, stainless steel is preferable.

(Solid Electrolyte Layer)

The solid electrolyte layer is a layer interposed between the positive electrode layer and the negative electrode layer and is a layer formed of a lithium-ion conductive material. The lithium-ion conductive material contained in the solid electrolyte layer is not particularly limited as long as it exhibits lithium-ion conductivity.

The lithium-ion conductive material contained in the solid electrolyte layer is preferably the sintered body described above (a sintered body obtained by sintering the ceramic powder material described above). The content of the sintered body in the solid electrolyte layer is not particularly limited as long as it is a proportion at which the electron conductivity can be sufficiently suppressed but is preferably in a range of, for example, 50% by volume to 100% by volume.

The solid electrolyte layer can also contain a lithium-ion conductive material other than the sintered body. Specific examples thereof include NASICON-type compounds such as $Li_{1.3}Al_{0.3}Ti_{1.7}(PO_4)_3$, $Li_{1.5}Al_{0.5}Ge_{1.5}(PO_4)_3$, $LiZr_2(PO_4)_3$, $Li_{1.2}Ca_{0.1}Zr_{1.9}(PO_4)_3$, and $Li_{1.15}Y_{0.15}Zr_{1.85}(PO_4)_3$, lithium-ion conductive oxide glass such as $Li_2O$—$B_2O_3$-based glass, $Li_2O$—$SiO_2$-based glass, $Li_2O$—$P_2O_5$-based glass, and $Li_{2.9}PO_{3.3}N_{0.46}$-based glass (LIPON), and lithium-ion conductive sulfide glass such as $Li_2S$—$B_2S_3$-based glass, $Li_2S$—$SiS_2$-based glass, and $Li_2S$—$P_2S_5$-based glass. Lithium-ion conductive oxide glass and lithium-ion conductive sulfide glass can also be crystallized and used as a glass-ceramic material.

The thickness of the solid electrolyte layer is not particularly limited as long as it is a thickness capable of preventing a short circuit of the all-solid-state lithium-ion secondary battery but can be, for example, in a range of 0.1 μm to 1,000 μm. Among these, the thickness is preferably in a range of 0.1 μm to 300 μm.

The solid electrolyte layer can be fabricated by molding and sintering the above-described lithium-ion conductive material. The method for molding and sintering the lithium-ion conductive material constituting the solid electrolyte layer is not particularly limited, and generally known molding and sintering methods can be used. The sintering temperature is not particularly limited but is preferably a temperature in a range of 700 to 1,200° C., more preferably a temperature in a range of 700 to 1,100° C., still more preferably a temperature in a range of 700 to 1,000° C., for example, in a case where the lithium-ion conductive material is the above-described ceramic powder material. However, 1,050° C. or less is preferable and 1,000° C. or less is more preferable from the viewpoint of suppressing the decomposition reaction involving melting and volatilization of Li. The sintering density of the solid electrolyte layer is preferably 60% or more, more preferably 70% or more, still more preferably 80% or more, and yet still more preferably 90% or more with respect to the theoretical density. This is because the resistance can be further suppressed as the sintering density is higher. When sintering of the solid electrolyte layer is performed, it is preferable to perform integral sintering with at least one of the above-described positive electrode layer or negative electrode layer. This is because the resistance at the layer interface can be lowered by integral sintering.

(Configuration of all-Solid-State Lithium-Ion Secondary Battery)

The shape of the all-solid-state lithium-ion secondary battery can be, for example, a coin type, a laminate type, a cylindrical type, or a square type.

The method for producing the all-solid-state lithium-ion secondary battery of the present embodiment is not particularly limited as long as it is a method capable of constructing the all-solid-state lithium-ion secondary battery described above, and a method similar to the general method for producing an all-solid-state lithium-ion secondary battery can be used. For example, the all-solid-state lithium-ion secondary battery of the present embodiment is produced by laminating the above-described positive electrode layer, solid electrolyte layer, and negative electrode layer in this order.

According to the all-solid-state lithium-ion secondary battery of the present embodiment, the sintered body described above is contained, thus the internal resistance of the battery is suppressed by the high lithium-ion conductance of the garnet-type compound and the battery performance such as rate characteristics is improved. The ceramic powder material is in the form of fine particles, and thus the contact interface with the electrode active material can be sufficiently secured as the ceramic powder material is contained in the electrode layer. Consequently, the ion conduction path to the electrode active material is favorably constructed, the proportion of the electrode active material which cannot contribute to the battery reaction decreases, and thus the energy density of the battery is improved.

In the embodiment described above, a case where the above-described ceramic powder material is used in an all-solid-state lithium-ion secondary battery has been described. However, the battery according to the present invention is not limited to the all-solid-state lithium-ion secondary battery as long as the battery contains a sintered body obtained by sintering the above-described ceramic powder material.

EXAMPLES

Hereinafter, the present invention will be described in detail with reference to Examples, but the present invention is not limited to the following Examples as long as the gist thereof is not deviated.

The maximum value and the minimum value of the content of each component shown in the following Examples should be considered as a preferable minimum value and a preferable maximum value of the present invention regardless of the content of other components.

In addition, the maximum value and the minimum value of the measured values shown in the following Examples should be considered to be the preferred minimum value and maximum value of the present invention regardless of the content (composition) of each component.

[Raw Materials]

The following raw materials were prepared for producing the ceramic powder materials of Examples.

<La Source>

Aqueous lanthanum nitrate solution (La concentration: 16% by mass)

<Zr Source>

Aqueous ammonium zirconium carbonate solution (Zr concentration: 10% by mass)

<Nb Source>

Aqueous ammonium niobium oxalate solution (Nb concentration: 5% by mass)

Composition formula: $[NH_4(NbO(C_2O_4)_2(H_2O)_2)(H_2O)_3]$

<Al Source>

Aqueous aluminum nitrate solution (Al concentration: 10% by mass)

<Ga Source>

Aqueous gallium nitrate solution (Ga concentration: 10% by mass)

<Li Source>

Lithium Hydroxide Monohydrate (Powder)

A zirconium-containing compound usually contains a hafnium component as an unavoidable component. Hafnium is contained in the raw materials and the ceramic powder materials obtained in the following Examples and Comparative Examples at a proportion to zirconium of 0.03 as a molar ratio (number of moles of Hf/number of moles of Zr). In the ceramic powder material produced, the hafnium component is not observed as an impurity compound but is considered to exist at the zirconium position in the crystal structure of the ceramic powder material. Consequently, in the following Examples and Comparative Examples, the Zr concentration is expressed as the sum of the concentrations of zirconium and hafnium unless otherwise stated. Zr in the composition ratio means the sum of zirconium and hafnium.

[Preparation of Ceramic Powder Material]

Example 1

<Preparation of Precursor Oxide of First Garnet-Type Compound>

Ammonium hydrogencarbonate (50.0 g) was dissolved in 200 g of water. A mixed solution of 83.41 g of an aqueous lanthanum nitrate solution and 2.23 g of an aqueous gallium nitrate solution was added dropwise thereto at a rate of 8.5 g/min to obtain a precipitate A (first step). Thereafter, 58.97 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with 2,000 mL of pure water, water was removed, and the precipitate B was thus separated from the slurry. The obtained precipitate B was calcined at 800° C. for 5 hours to obtain a precursor oxide of the first garnet-type compound (third step).

<Preparation of First Garnet-Type Compound>

The precursor oxide of the first garnet-type compound and 9.0 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Precursor Oxide of Second Garnet-Type Compound>

A precursor oxide of a second garnet-type compound was obtained in the same manner as in the above "Preparation of precursor oxide of first garnet-type compound" except that the addition amount of the aqueous lanthanum nitrate solution was changed to 81.99 g, the addition amount of the aqueous gallium nitrate solution was changed to 8.78 g, and the addition amount of the aqueous ammonium zirconium carbonate solution was changed to 57.96 g.

<Preparation of Second Garnet-Type Compound>

The precursor oxide of the second garnet-type compound and 7.66 g of lithium hydroxide monohydrate were pulverized and mixed in a ball mill (fourth step). Thereafter, the pulverized mixture was calcined at 800° C. for 3 hours (fifth step) to obtain a first garnet-type compound.

The compositions of the first garnet-type compound and the second garnet-type compound calculated from each raw material are as shown in Table 1. The compositions of the first garnet-type compound and the second garnet-type compound of Examples and Comparative Examples described below are similarly shown in Table 1. The composition of the entire ceramic powder material obtained by mixing the first garnet-type compound and the second garnet-type compound is also shown in Table 1.

<Preparation of Ceramic Powder Material Containing First Garnet-Type Compound and Second Garnet-Type Compound>

In a 80 mL magnesia-stabilized zirconia container, 10 g of the first garnet-type compound and 10 g of the second garnet-type compound were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 1.

Example 2

<Preparation of Precursor Oxide of First Garnet-Type Compound>

Ammonium hydrogencarbonate (50.0 g) was dissolved in 200 g of water. To the solution, 83.90 g of an aqueous lanthanum nitrate solution was added dropwise at a rate of 8.5 g/min to obtain a precipitate A (first step). Thereafter, 59.31 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with 2,000 mL of pure water, water was removed, and the precipitate B was thus separated from the slurry. The obtained precipitate B was calcined at 800° C. for 5 hours to obtain a precursor oxide of the first garnet-type compound (third step).

<Preparation of First Garnet-Type Compound>

The precursor oxide of the first garnet-type compound and 9.46 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Ceramic Powder Material Containing First Garnet-Type Compound and Second Garnet-Type Compound>

In a 80 mL magnesia-stabilized zirconia container, 7.5 g of the first garnet-type compound and 12.5 g of the second garnet-type compound of Example 1 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 2.

Example 3

<Preparation of Precursor Oxide of Second Garnet-Type Compound>

Ammonium hydrogencarbonate (50.0 g) was dissolved in 200 g of water. A mixed solution of 83.65 g of an aqueous lanthanum nitrate solution and 3.47 g of an aqueous aluminum nitrate solution was added dropwise thereto at a rate of 8.5 g/min to obtain a precipitate A (first step). Thereafter, 59.14 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9.5 to 10, and then the slurry was heated at 90° C. for 180 minutes.

The obtained slurry containing the precipitate B was suction-filtered, the filtered substance was washed with 2,000 mL of pure water, water was removed, and the precipitate B was thus separated from the slurry. The obtained precipitate B was calcined at 800° C. for 5 hours to obtain a precursor oxide of the second garnet-type compound (third step).

<Preparation of Second Garnet-Type Compound>

The precursor oxide of the second garnet-type compound and 7.81 g of lithium hydroxide monohydrate were pulverized and mixed in a ball mill (fourth step). Thereafter, the pulverized mixture was calcined at 800° C. for 3 hours (fifth step) to obtain a second garnet-type compound.

<Preparation of Ceramic Powder Material Containing First Garnet-Type Compound and Second Garnet-Type Compound>

In a 80 mL magnesia-stabilized zirconia container, 7.5 g of the first garnet-type compound of Example 2 and 12.5 g of the second garnet-type compound were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 3.

Example 4

<Preparation of Precursor Oxide of Second Garnet-Type Compound>

A precursor oxide of a second garnet-type compound was obtained in the same manner as in "Preparation of precursor oxide of second garnet-type compound" described in Example 3 except that the addition amount of the aqueous lanthanum nitrate solution was changed to 83.71 g, the addition amount of the aqueous aluminum nitrate solution was changed to 2.6 g, and the addition amount of the aqueous ammonium zirconium carbonate solution was changed to 59.18 g.

<Preparation of Second Garnet-Type Compound>

The precursor oxide of the second garnet-type compound and 8.23 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Ceramic Powder Material Containing First Garnet-Type Compound and Second Garnet-Type Compound>

In a 80 mL magnesia-stabilized zirconia container, 4 g of the first garnet-type compound of Example 2 and 16 g of the second garnet-type compound were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 4.

Example 5

<Preparation of Precursor Oxide of First Garnet-Type Compound>

Ammonium hydrogencarbonate (50.0 g) was dissolved in 200 g of water, and 12.85 g of an aqueous ammonium niobium oxalate solution was then added thereto. To the solution, 83.97 g of an aqueous lanthanum nitrate solution was added dropwise at a rate of 8.5 g/min to obtain a precipitate A (first step). Thereafter, 54.98 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9 to 11, and then the slurry was heated at 90° C. for 180 minutes.

The obtained slurry containing the precipitate B was suction-filtered, the filtered substance was washed with 2,000 mL of pure water, water was removed, and the precipitate B was thus separated from the slurry. The obtained precipitate B was calcined at 800° C. for 5 hours to obtain a precursor oxide of the first garnet-type compound (third step).

<Preparation of First Garnet-Type Compound>

The precursor oxide and 9.26 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Precursor Oxide of Second Garnet-Type Compound>

A precursor oxide of a second garnet-type compound was obtained in the same manner as in the above "Preparation of precursor oxide of first garnet-type compound" except that the addition amount of the aqueous lanthanum nitrate solution was changed to 84.28 g, the addition amount of the aqueous ammonium niobium oxalate solution was changed to 55.89 g, and the addition amount of the aqueous ammonium zirconium carbonate solution was changed to 40.27 g.

<Preparation of Second Garnet-Type Compound>

The precursor oxide of the second garnet-type compound and 8.62 g of lithium hydroxide monohydrate were pulverized and mixed in a ball mill (fourth step). Thereafter, the pulverized mixture was calcined at 800° C. for 3 hours (fifth step) to obtain a second garnet-type compound.

<Preparation of Ceramic Powder Material Containing First Garnet-Type Compound and Second Garnet-Type Compound>

In a 80 mL magnesia-stabilized zirconia container, 6 g of the first garnet-type compound and 14 g of the second garnet-type compound were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 5.

Example 6

<Preparation of Ceramic Powder Material Containing First Garnet-Type Compound and Second Garnet-Type Compound>

In a 80 mL magnesia-stabilized zirconia container, 10 g of the first garnet-type compound of Example 5 and 10 g of the second garnet-type compound of Example 5 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 6.

Example 7

<Preparation of Precursor Oxide of First Garnet-Type Compound>

A precursor oxide of a first garnet-type compound was obtained in the same manner as in "Preparation of precursor oxide of first garnet-type compound" described in Example 5 except that the addition amount of the aqueous lanthanum nitrate solution was changed to 84.19 g, the addition amount of the aqueous ammonium niobium oxalate solution was changed to 42.95 g, and the addition amount of the aqueous ammonium zirconium carbonate solution was changed to 44.69 g.

<Preparation of First Garnet-Type Compound>

The precursor oxide of the second garnet-type compound and 8.81 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Precursor Oxide of Second Garnet-Type Compound>

A precursor oxide of a second garnet-type compound was obtained in the same manner as in "Preparation of precursor oxide of first garnet-type compound" described in Example 1 except that the addition amount of the aqueous lanthanum nitrate solution was changed to 82.44 g, the addition amount of the aqueous gallium nitrate solution was changed to 5.7 g, and the addition amount of the aqueous ammonium zirconium carbonate solution was changed to 57.89 g.

<Preparation of Second Garnet-Type Compound>

The precursor oxide of the second garnet-type compound and 8.61 g of lithium hydroxide monohydrate were pulverized and mixed in a ball mill (fourth step). Thereafter, the pulverized mixture was calcined at 800° C. for 3 hours (fifth step) to obtain a first garnet-type compound.

<Preparation of Ceramic Powder Material Containing First Garnet-Type Compound and Second Garnet-Type Compound>

In a 80 mL magnesia-stabilized zirconia container, 2 g of the first garnet-type compound and 18 g of the second garnet-type compound of Example 1 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 7.

Example 8

<Preparation of Ceramic Powder Material Containing First Garnet-Type Compound and Second Garnet-Type Compound>

In a 80 mL magnesia-stabilized zirconia container, 4 g of the first garnet-type compound of Example 7 and 16 g of the second garnet-type compound of Example 7 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 8.

Example 9

<Preparation of Ceramic Powder Material Containing First Garnet-Type Compound and Second Garnet-Type Compound>

In a 80 mL magnesia-stabilized zirconia container, 8 g of the first garnet-type compound of Example 7 and 12 g of the second garnet-type compound of Example 7 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 9.

Example 10

<Preparation of Ceramic Powder Material Containing First Garnet-Type Compound and Second Garnet-Type Compound>

In a 80 mL magnesia-stabilized zirconia container, 10 g of the first garnet-type compound of Example 7 and 10 g of the second garnet-type compound of Example 7 were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 10.

Example 11

<Preparation of Ceramic Powder Material Containing First Garnet-Type Compound and Second Garnet-Type Compound>

In a 80 mL magnesia-stabilized zirconia container, 3.8 g of the first garnet-type compound of Example 2, 15.6 g of the second garnet-type compound of Example 4, and 0.6 of calcium oxide were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 11.

Example 12

<Preparation of Ceramic Powder Material Containing First Garnet-Type Compound and Second Garnet-Type Compound>

In a 80 mL magnesia-stabilized zirconia container, 4 g of the first garnet-type compound of Example 2, 16 g of the second garnet-type compound of Example 4, and 0.04 g of magnesium oxide were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 12.

Example 13

<Preparation of Ceramic Powder Material Containing First Garnet-Type Compound and Second Garnet-Type Compound>

In a 80 mL magnesia-stabilized zirconia container, 3.96 g of the first garnet-type compound of Example 2, 15.8 g of the second garnet-type compound of Example 4, and 0.2 g of yttrium oxide were placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Example 13.

Comparative Example 1

<Preparation of Precursor Oxide of Second Garnet-Type Compound>

A precursor oxide of a second garnet-type compound was obtained in the same manner as in "Preparation of precursor oxide of first garnet-type compound" described in Example 1 except that the addition amount of the aqueous lanthanum nitrate solution was changed to 82.69 g, the addition amount of the aqueous gallium nitrate solution was changed to 5.53 g, and the addition amount of the aqueous ammonium zirconium carbonate solution was changed to 58.46 g.

<Preparation of Second Garnet-Type Compound>

The precursor oxide of the second garnet-type compound and 8.32 g of lithium hydroxide monohydrate were pulverized and mixed in a ball mill (fourth step). Thereafter, the pulverized mixture was calcined at 800° C. for 3 hours (fifth step) to obtain a second garnet-type compound. In a 80 mL magnesia-stabilized zirconia container, 20 g of the prepared second garnet compound was placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Comparative Example 1.

The composition (molar ratio of each element) of the ceramic powder material of Comparative Example 1 was adjusted to be the same as the composition (molar ratio of each element) of the ceramic powder material of Example 1.

Comparative Example 2

<Preparation of Precursor Oxide of Second Garnet-Type Compound>

A precursor oxide of a second garnet-type compound was obtained in the same manner as in "Preparation of precursor oxide of first garnet-type compound" described in Example 3 except that the addition amount of the aqueous lanthanum nitrate solution was changed to 83.74 g, the addition amount of the aqueous aluminum nitrate solution was changed to 2.17 g, and the addition amount of the aqueous ammonium zirconium carbonate solution was changed to 59.2 g.

<Preparation of Second Garnet-Type Compound>

The precursor oxide of the second garnet-type compound and 8.43 g of lithium hydroxide monohydrate were pulverized and mixed in a ball mill (fourth step). Thereafter, the pulverized mixture was calcined at 800° C. for 3 hours (fifth step) to obtain a second garnet-type compound.

In a 80 mL magnesia-stabilized zirconia container, 20 g of the prepared second garnet compound was placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Comparative Example 2.

The composition (molar ratio of each element) of the ceramic powder material of Comparative Example 2 was adjusted to be the same as the composition (molar ratio of each element) of the ceramic powder material of Example 3.

Comparative Example 3

In a 80 mL magnesia-stabilized zirconia container, 20 g of the first garnet compound of Example 7 was placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Comparative Example 3.

The composition (molar ratio of each element) of the ceramic powder material of Comparative Example 3 was adjusted to be the same as the composition (molar ratio of each element) of the ceramic powder material of Example 5.

Comparative Example 4

<Preparation of Precursor Oxide of Second Garnet-Type Compound>

Ammonium hydrogencarbonate (50.0 g) was dissolved in 200 g of water, and 4.61 g of an aqueous ammonium niobium oxalate solution was then added thereto. To the solution, 80.31 g of an aqueous lanthanum nitrate solution was added dropwise at a rate of 8.5 g/min to obtain a precipitate A (first step). Thereafter, 57.86 g of an aqueous ammonium zirconium carbonate solution was added dropwise to the obtained precipitate A at a rate of 0.5 g/min to obtain a slurry containing a precipitate B (second step). Next, the pH of the slurry was adjusted using ammonia water so that the pH fell within a range of 9 to 11, and then the slurry was heated at 90° C. for 180 minutes.

The obtained slurry containing the precipitate B was suction-filtered, the filtered substance was washed with 2,000 mL of pure water, water was removed, and the precipitate B was thus separated from the slurry. The obtained precipitate B was calcined at 800° C. for 5 hours to obtain a precursor oxide of the second garnet-type compound (third step).

<Preparation of Second Garnet-Type Compound>

The precursor oxide of the second garnet-type compound and 9.08 g of lithium hydroxide monohydrate were pulverized and mixed in a ball mill (fourth step). Thereafter, the pulverized mixture was calcined at 800° C. for 3 hours (fifth step) to obtain a second garnet-type compound.

In a 80 mL magnesia-stabilized zirconia container, 20 g of the prepared second garnet compound was placed, 100 g of yttria-stabilized zirconia balls (diameter: 5 mm) were added, and then pulverization and mixing were performed by a planetary ball mill (pulverizer; Pulverisette manufactured by Fritsch GmbH) to obtain a ceramic powder material according to Comparative Example 4.

The composition (molar ratio of each element) of the ceramic powder material of Comparative Example 4 was adjusted to be the same as the composition (molar ratio of each element) of the ceramic powder material of Example 8.

[Measurement of Pore Volume]

The pore distribution of the first garnet-type compound and the second garnet-type compound of each of Examples and Comparative Examples was obtained by a mercury intrusion method using a pore distribution measuring apparatus ("Autopore IV9500" manufactured by Micromeritics Instrument Corporation). The measurement conditions were set as follows. As a pretreatment for the measurement, the ceramic powder material was dried under reduced pressure at 200° C. for 3 hours.

<Measurement Conditions>

Measuring apparatus: pore distribution measuring apparatus (Autopore IV9500 manufactured by Micromeritics Instrument Corporation)

Sampling amount: 0.5 to 0.7 g

Measurement range: 0.0036 to 10.3 μm

Number of measurement points: 120 points

Mercury contact angle: 140 degrees
Mercury surface tension: 480 dyne/cm
Measurement temperature: 25° C.
Measurement pressure: 0.0155 to 27.46 MPa The pore volume was determined using the obtained pore distribution. The results are shown in Table 1.

[Measurement of Specific Surface Area]

The specific surface area of the first garnet-type compound and the second garnet-type compound of each of Examples and Comparative Examples was measured by the BET method using a specific surface area meter ("Macsorb" manufactured by Mountech Co., Ltd.). The results are shown in Table 1.

[Measurement of Particle Size]

In a laser diffraction/scattering particle size distribution measuring apparatus ("LA-950" manufactured by HORIBA, Ltd.), 0.1 g of the ceramic powder material of each of Examples and Comparative Examples was placed, and the particle size $D_{50}$ was measured. The results are shown in Table 1.

Conditions of the measuring apparatus were set as follows.

Dispersion medium: ion-exchanged water
Refractive index: 2.09
Particle size standard: volume
Measurement upper limit: 3,000 μm
Measurement lower limit: 0.01 μm

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Ceramic powder material | Composition (molar ratio) | Li | 6.25 | 6.25 | 6.25 | 6.28 | 6.50 | 6.60 | 6.46 | 6.47 | 6.47 |
| | | La | 3.00 | 3.00 | 3.00 | 3.00 | 3.00 | 3.00 | 3.00 | 3.00 | 3.00 |
| | | Zr | 2.00 | 2.00 | 2.00 | 2.00 | 1.50 | 1.60 | 1.94 | 1.87 | 1.84 |
| | | Al | 0.00 | 0.00 | 0.25 | 0.24 | 0.00 | 0.00 | 0.00 | 0.00 | 0.00 |
| | | Ga | 0.25 | 0.25 | 0.00 | 0.00 | 0.00 | 0.00 | 0.23 | 0.21 | 0.15 |
| | | Nb | 0.00 | 0.00 | 0.00 | 0.00 | 0.50 | 0.40 | 0.05 | 0.10 | 0.18 |
| | Li/La (molar ratio) | | 2.08 | 2.08 | 2.08 | 2.09 | 2.17 | 2.20 | 2.15 | 2.16 | 2.16 |
| | [3 × (M1) + (M2)]/(La) | | 0.25 | 0.25 | 0.25 | 0.24 | 0.17 | 0.13 | 0.25 | 0.24 | 0.21 |
| First garnet-type compound $[Li_{7-(3x+y)}M1_xLa_3Zr_{2-y}M2_yO_{12}]$ | Composition | M1 | Ga | — | — | — | — | — | — | — | — |
| | | M2 | — | — | — | — | Nb | Nb | Nb | Nb | Nb |
| | | x | 0.1 | 0 | 0 | 0 | 0 | 0 | 0 | 0 | 0 |
| | | y | 0 | 0 | 0 | 0 | 0.15 | 0.15 | 0.5 | 0.5 | 0.5 |
| | | 3x + y | 0.3 | 0 | 0 | 0 | 0.15 | 0.15 | 0.5 | 0.5 | 0.5 |
| | Pore volume (mL/g) | | 0.90 | 0.86 | 0.86 | 0.86 | 0.72 | 0.72 | 0.67 | 0.67 | 0.67 |
| | Specific surface area (m²/g) | | 0.8 | 0.9 | 0.9 | 0.9 | 0.8 | 0.8 | 0.8 | 0.8 | 0.8 |
| | $D_{50}$ (μm) | | 11.6 | 12.1 | 12.1 | 12.1 | 13.0 | 13.0 | 10.9 | 10.9 | 10.9 |
| Second garnet-type compound $[Li_{7-(3x+y)}M1_xLa_3Zr_{2-y}M2_yO_{12}]$ | Composition | M1 | Ga | Ga | Al | Al | — | — | Ga | Ga | Ga |
| | | M2 | — | — | — | — | Nb | Nb | — | — | — |
| | | x | 0.4 | 0.4 | 0.4 | 0.3 | 0 | 0 | 0.26 | 0.26 | 0.26 |
| | | y | 0 | 0 | 0 | 0 | 0.65 | 0.65 | 0 | 0 | 0 |
| | | 3x + y | 1.2 | 1.2 | 1.2 | 0.9 | 0.65 | 0.65 | 0.78 | 0.78 | 0.78 |
| | Pore volume (mL/g) | | 0.84 | 0.84 | 0.83 | 0.85 | 0.77 | 0.77 | 0.86 | 0.86 | 0.86 |
| | Specific surface area (m²/g) | | 0.7 | 0.7 | 0.6 | 0.6 | 0.6 | 0.6 | 0.7 | 0.7 | 0.7 |
| | $D_{50}$ (μm) | | 9.2 | 9.2 | 8.1 | 8.3 | 10.1 | 10.1 | 9.3 | 9.3 | 9.3 |
| Absolute value of difference of (3x + y) | | | 0.9 | 1.2 | 1.2 | 0.9 | 0.5 | 0.5 | 0.28 | 0.28 | 0.28 |
| First garnet-type compound (% by mass) | | | 50.0 | 37.5 | 37.5 | 20.0 | 30.0 | 50.0 | 10.0 | 20.0 | 40.0 |
| Second garnet-type compound (% by mass) | | | 50.0 | 62.5 | 62.5 | 80.0 | 70.0 | 50.0 | 90.0 | 80.0 | 60.0 |
| Third component | Chemical formula | | None | None | None | None | None | None | None | None | None |
| | Content (% by mass) | | — | — | — | — | — | — | — | — | — |

| | | | Example 10 | Example 11 | Example 12 | Example 13 | Comparative Example 1 | Comparative Example 2 | Comparative Example 3 | Comparative Example 4 |
|---|---|---|---|---|---|---|---|---|---|---|
| Ceramic powder material | Composition (molar ratio) | Li | 6.47 | 6.28 | 6.28 | 6.28 | 6.25 | 6.25 | 6.50 | 6.47 |
| | | La | 3.00 | 3.00 | 3.00 | 3.00 | 3.00 | 3.00 | 3.00 | 3.00 |
| | | Zr | 1.79 | 2.00 | 2.00 | 2.00 | 2.00 | 2.00 | 1.50 | 1.87 |
| | | Al | 0.00 | 0.24 | 0.24 | 0.24 | 0.00 | 0.25 | 0.00 | 0.00 |
| | | Ga | 0.13 | 0.00 | 0.00 | 0.00 | 0.25 | 0.00 | 0.00 | 0.21 |
| | | Nb | 0.15 | 0.00 | 0.00 | 0.00 | 0.00 | 0.00 | 0.50 | 0.10 |
| | Li/La (molar ratio) | | 2.16 | 2.09 | 2.09 | 2.09 | 2.08 | 2.08 | 2.17 | 2.16 |
| | [3 × (M1) + (M2)]/(La) | | 0.18 | 0.24 | 0.24 | 0.24 | 0.25 | 0.25 | 0.17 | 0.24 |
| First garnet-type compound $[Li_{7-(3x+y)}M1_xLa_3Zr_{2-y}M2_yO_{12}]$ | Composition | M1 | — | — | — | — | None | None | — | None |
| | | M2 | Nb | — | — | — | | | Nb | |
| | | x | 0 | 0 | 0 | 0 | | | 0 | |
| | | y | 0.5 | 0 | 0 | 0 | | | 0.5 | |
| | | 3x + y | 0.5 | 0 | 0 | 0 | | | 0.5 | |
| | Pore volume (mL/g) | | 0.67 | 0.86 | 0.86 | 0.86 | | | 0.67 | |
| | Specific surface area (m²/g) | | 0.8 | 0.9 | 0.9 | 0.9 | | | 0.8 | |
| | $D_{50}$ (μm) | | 10.9 | 12.1 | 12.1 | 12.1 | | | 10.9 | |

TABLE 1-continued

| | | | | | | | | | | | |
|---|---|---|---|---|---|---|---|---|---|---|---|
| Second garnet-type compound | Composition $[Li_{7-(3x+y)}M1_xLa_3Zr_{2-y}M2_yO_{12}]$ | M1 | Ga | Al | Al | Al | Ga | Al | None | Ga |
| | | M2 | — | — | — | — | — | — | | Nb |
| | | x | 0.26 | 0.3 | 0.3 | 0.3 | 0.25 | 0.25 | | 0.21 |
| | | y | 0 | 0 | 0 | 0 | 0 | 0 | | 0.1 |
| | | 3x + y | 0.78 | 0.9 | 0.9 | 0.9 | 0.75 | 0.75 | | 0.73 |
| | Pore volume (mL/g) | | 0.86 | 0.85 | 0.85 | 0.85 | 0.88 | 0.86 | | 0.76 |
| | Specific surface area (m$^2$/g) | | 0.7 | 0.6 | 0.6 | 0.6 | 0.8 | 0.7 | | 0.6 |
| | D$_{50}$ (μm) | | 9.3 | 8.3 | 8.3 | 8.3 | 8.8 | 9.0 | | 9.2 |
| Absolute value of difference of (3x + y) | | | 0.28 | 0.9 | 0.9 | 0.9 | — | — | — | — |
| First garnet-type compound (% by mass) | | | 50.0 | 19.4 | 20.0 | 19.8 | 0 | 0 | 100 | 0 |
| Second garnet-type compound (% by mass) | | | 50.0 | 77.7 | 79.8 | 79.2 | 100.0 | 100.0 | 0.0 | 100.0 |
| Third component | Chemical formula | | None | CaO | MgO | Y$_2$O$_3$ | None | None | None | None |
| | Content (% by mass) | | — | 2.9 | 0.2 | 1.0 | — | — | — | — |

[Identification of Crystal Phases]
(Crystal Phase of Ceramic Powder Material Before Heat Treatment)

X-ray diffraction spectra of the ceramic powder materials of Examples and Comparative Examples were obtained using an X-ray diffractometer ("RINT2500" manufactured by Rigaku Corporation). The measurement conditions were set as follows.

<Measurement Conditions>

Measuring apparatus: X-ray diffractometer (RINT2500, manufactured by Rigaku Corporation)

Radiation source: CuKα radiation source

Tube voltage: 50 kV

Tube current: 300 mA

Scanning speed: 4° (2θ)/min

As a result of the X-ray diffraction spectrum measurement, it was confirmed that the ceramic powder materials of Examples and Comparative Examples had a garnet-type structure.

[Fabrication of Sintered Body]

First, the ceramic powder material of each of Examples and Comparative Examples was pressurized by a cold isostatic pressing method (CIP) to obtain a molded body. The molding conditions were a molding pressure of 2 t/cm$^2$ and a pressurization time of 2 minutes.

Next, the molded body was sintered to obtain a sintered body.

The sintering conditions of Example 1, Example 2, Examples 7 to 10, Comparative Example 1, and Comparative Example 4 were 950° C. and 25 hours.

The sintering conditions of Example 3, Example 4, Examples 11 to 13, and Comparative Example 2 were 1,050° C. and 25 hours.

The sintering conditions of Example 5, Example 6, and Comparative Example 3 were 1,140° C. and 25 hours.

[SEM Image]

The cross section of the sintered body obtained in "Fabrication of sintered body" described above was observed by SEM.

Figure 2:
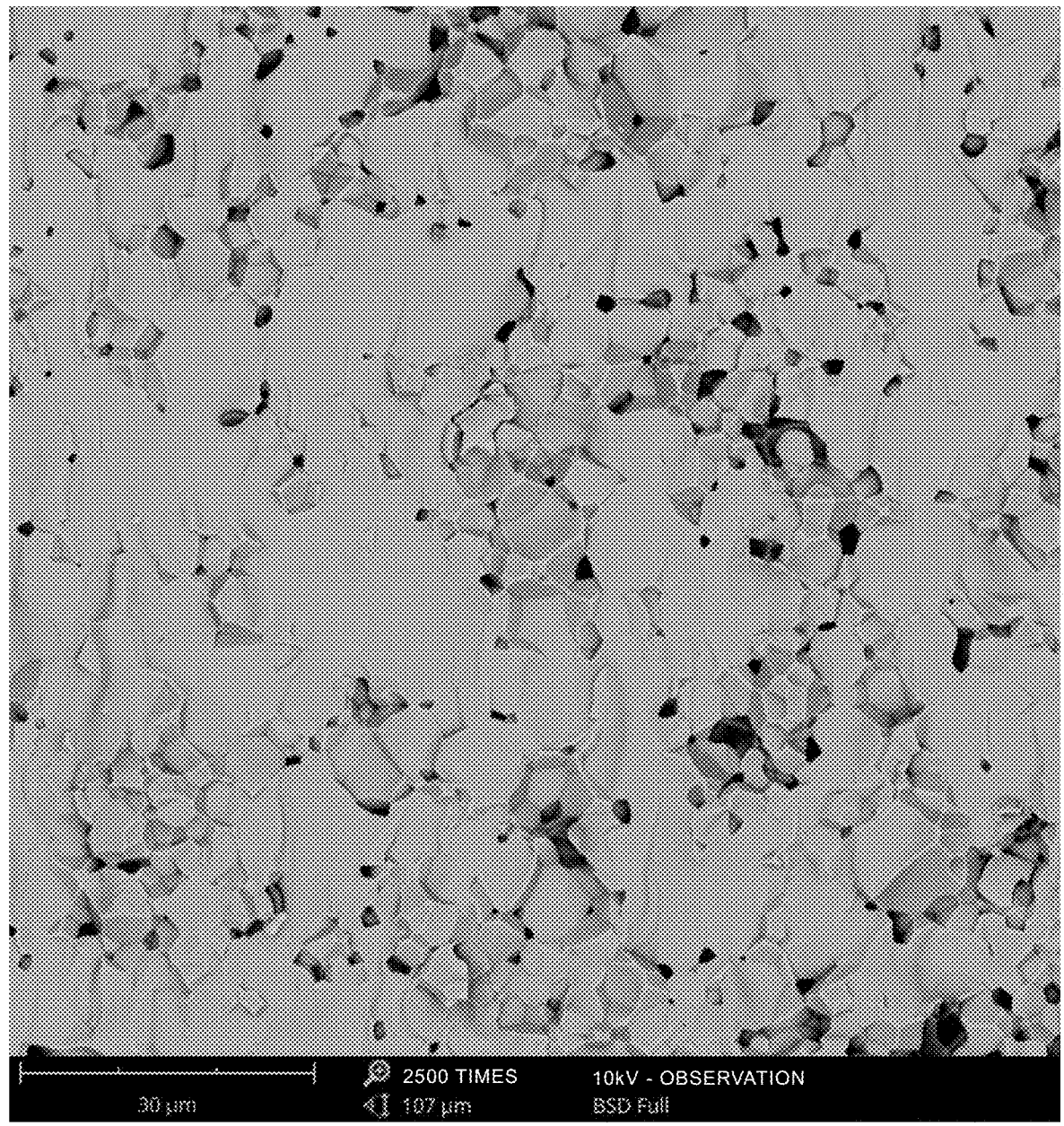
FIG. 2 is an SEM image of a sintered body of Example 3.
Figure 3:
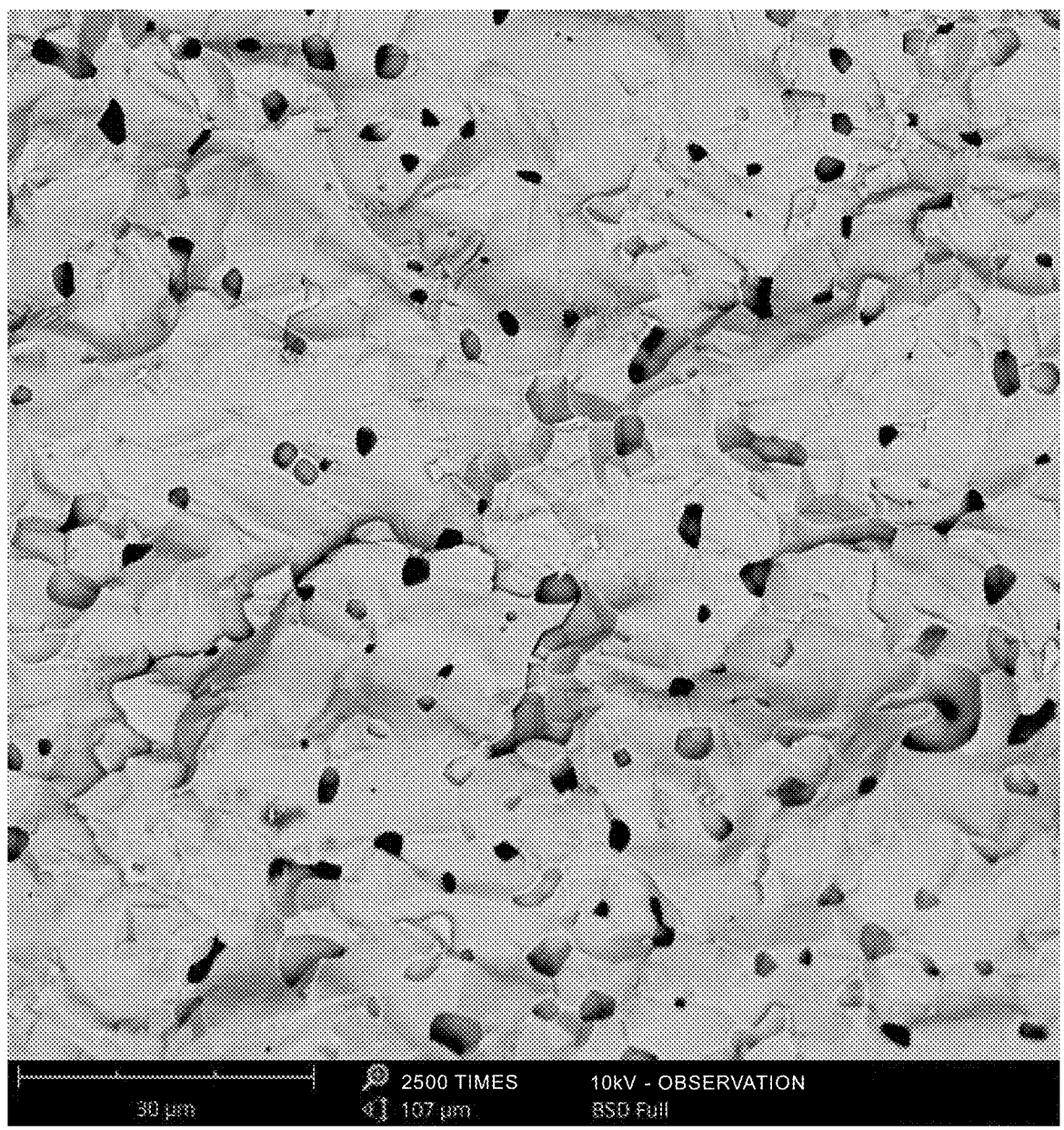
FIG. 3 is an SEM image of a sintered body of Example 5.
Figure 4:
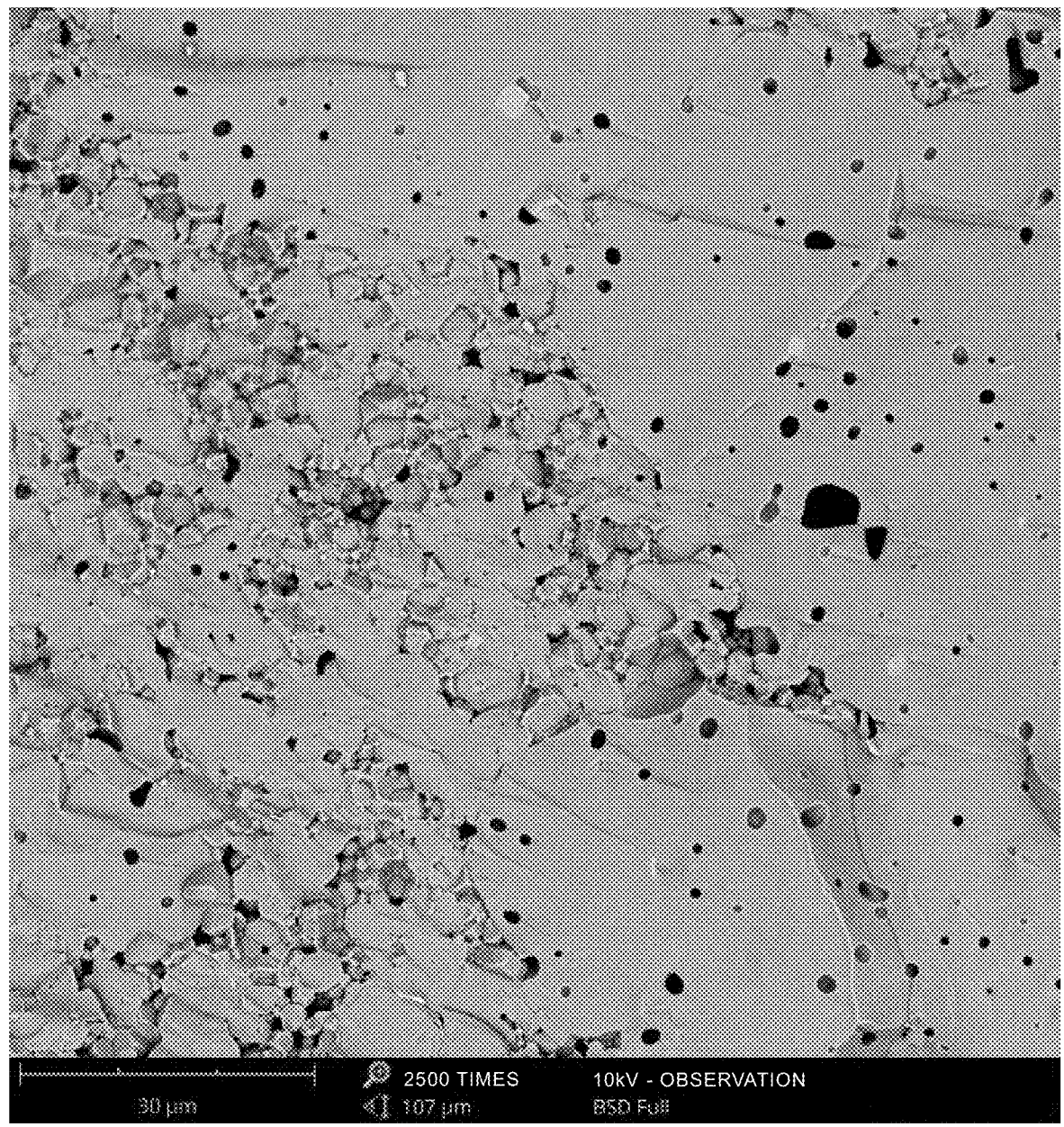
FIG. 4 is an SEM image of a sintered body of Example 8.
Figure 5:
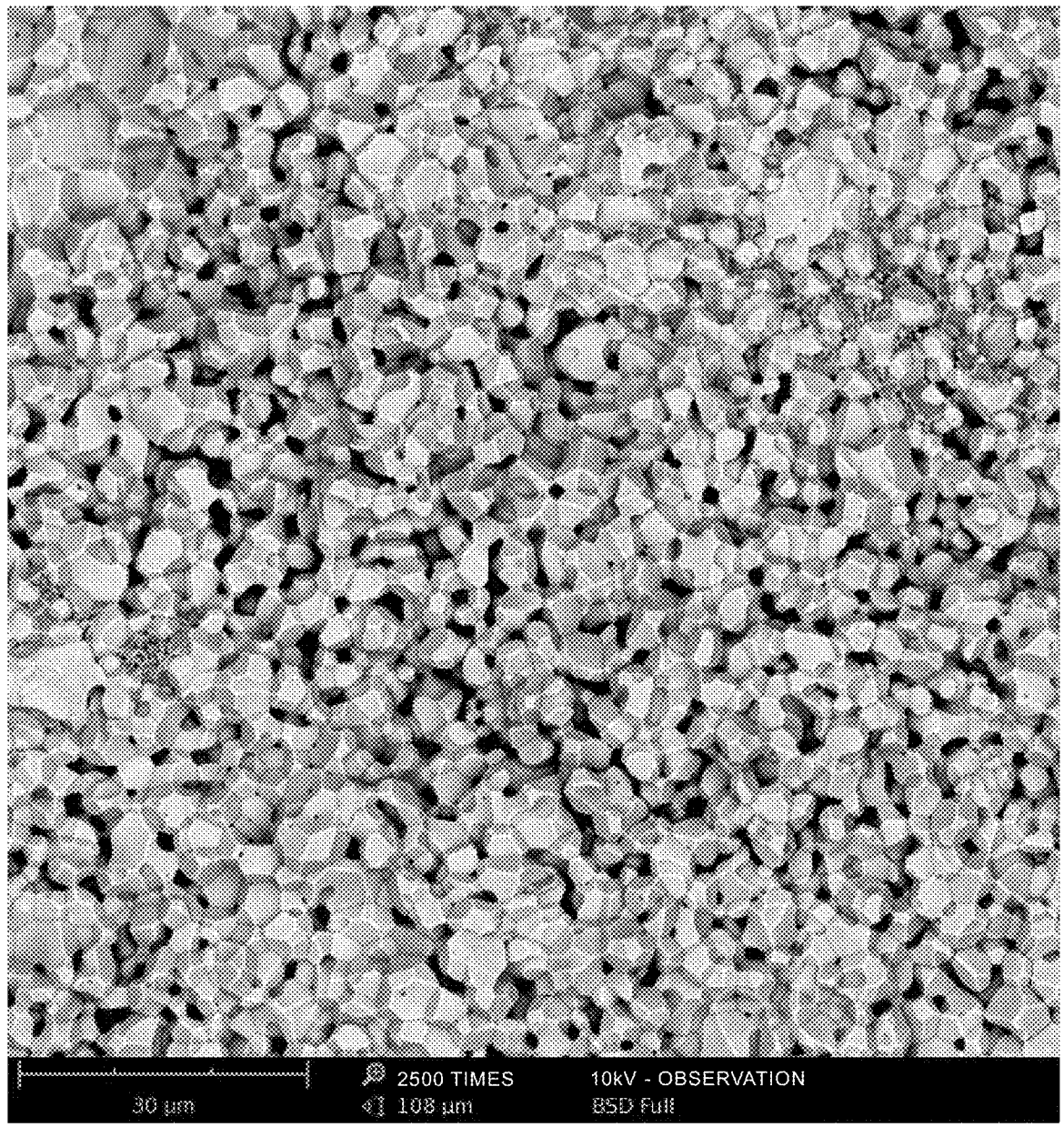
FIG. 5 is an SEM image of a sintered body of Comparative Example 1.
Figure 6:
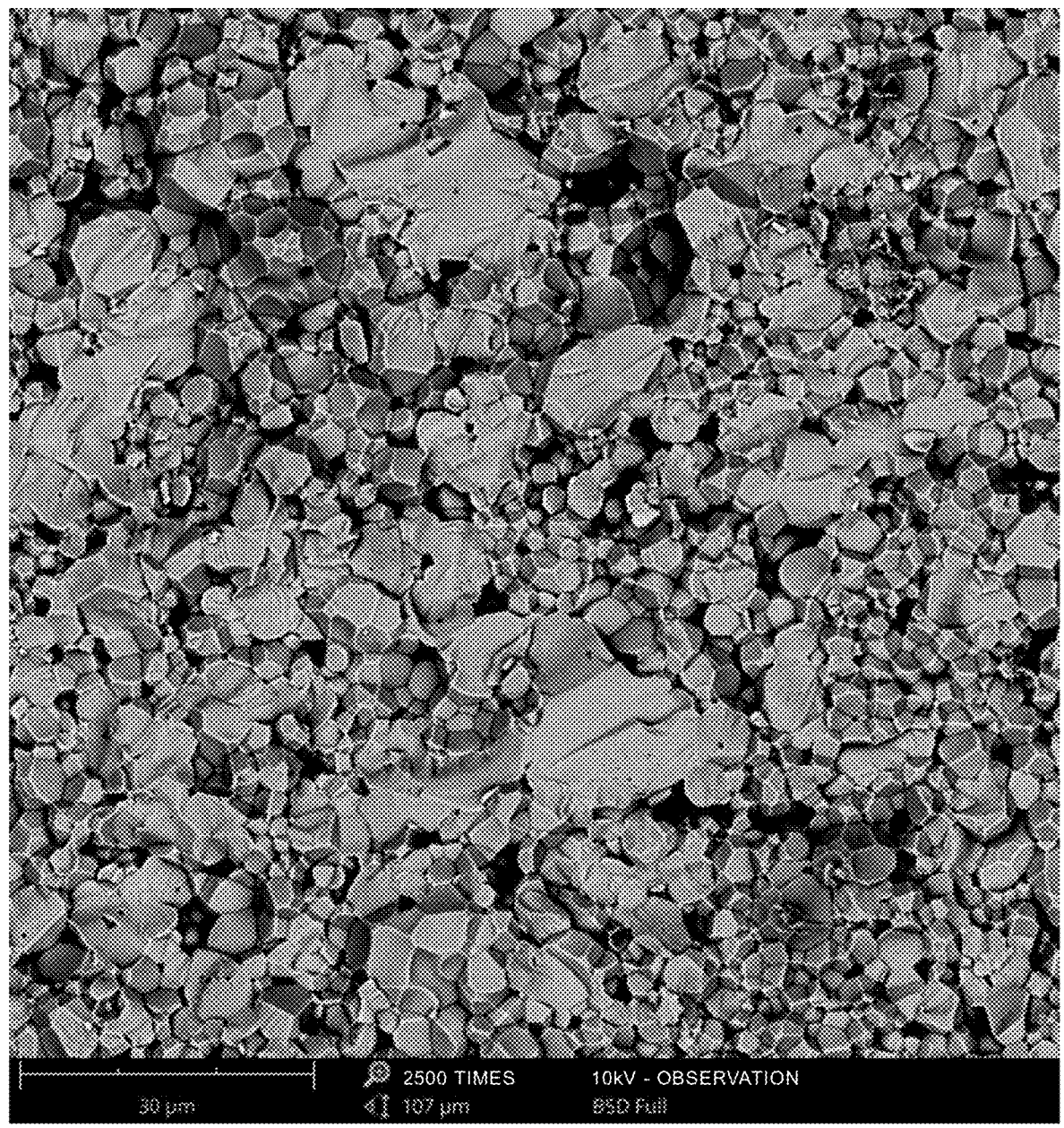
FIG. 6 is an SEM image of a sintered body of Comparative Example 2.
Figure 7:
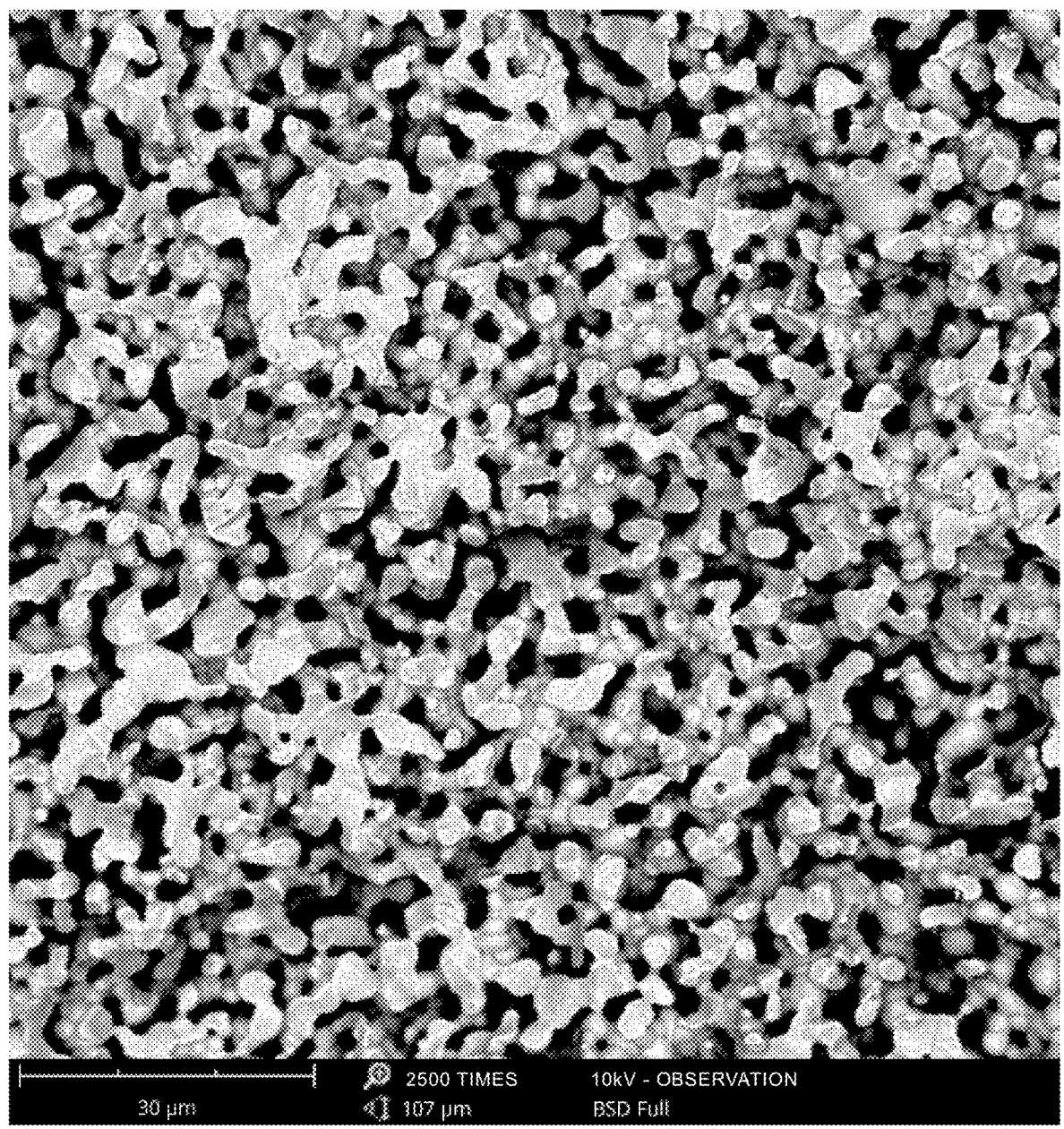
FIG. 7 is an SEM image of a sintered body of Comparative Example 3.
Figure 8:
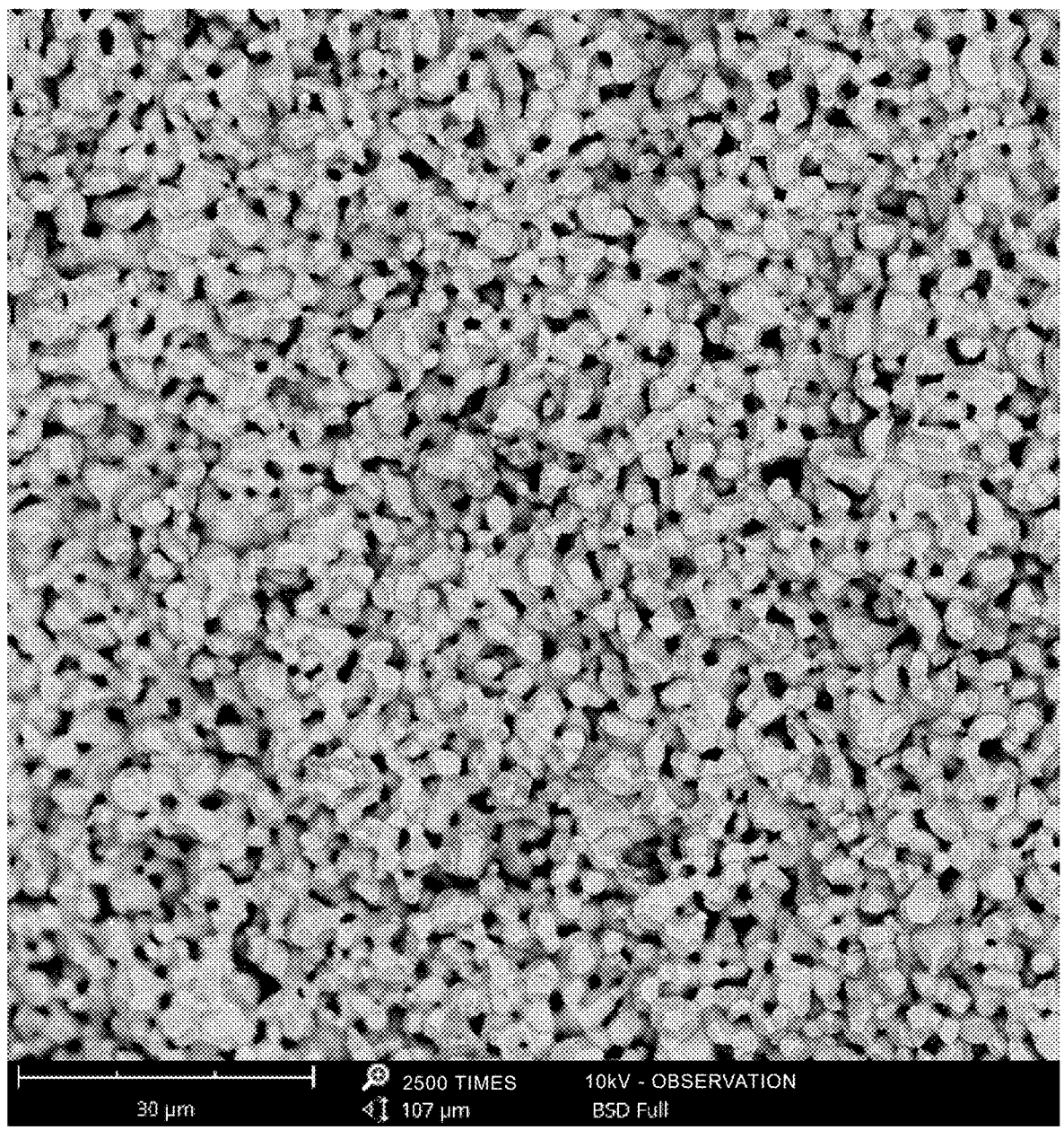
FIG. 8 is an SEM image of a sintered body of Comparative Example 4.

FIG. 1 shows an SEM image of the sintered body of Example 1; FIG. 2 shows an SEM image of the sintered body of Example 3; FIG. 3 shows an SEM image of the sintered body of Example 5; FIG. 4 shows an SEM image of the sintered body of Example 8; FIG. 5 shows an SEM image of the sintered body of Comparative Example 1; FIG. 6 shows an SEM image of the sintered body of Comparative Example 2; FIG. 7 shows an SEM image of the sintered body of Comparative Example 3; and FIG. 8 shows an SEM image of the sintered body of Comparative Example 4.

As is apparent from FIGS. 1 to 8, it was confirmed that the sintered bodies of Examples were a dense sintered body having fewer voids as compared with the sintered bodies of Comparative Examples.

[Density of Sintered Body]

The density of the fabricated sintered body was calculated by measuring the weight and volume of the sintered body. The results are shown in Table 2.

[Measurement of Ionic Conductivity of Sintered Body]

The ionic conductivity of the sintered body obtained in "Fabrication of sintered body" described above was measured.

Specifically, a conductive carbon paste was applied to both sides of the cylindrical sintered body obtained and dried to form an electrode. This was sandwiched between stainless steel plates connected to a platinum wire, fixed, held in a thermostat bath in an air atmosphere, and subjected to the AC impedance measurement under the following conditions to obtain the ionic conductivity ($O_T$) of the sintered body at the respective temperatures of 30° C. to 60° C. The ionic conductivity ($O_T$ (30° C.)) at a temperature of 30° C. at this time is shown in Table 2. In Comparative Example 3, the density of the sintered body was low, so that the measurement could not be performed.

<AC Impedance Measurement Conditions>

Instrument name: Frequency Response Analyzer (Model 1255B) and Potentiogalvanostat (Model 1287) manufactured by Solartron Analytical Measurement frequency region: 1 Hz to 1 MHz Measurement temperature region: 30 to 60° C.

[Activation Energy (Ea) of Lithium-Ion Conduction]

The activation energy (Ea) of lithium-ion conduction was calculated from the temperature dependency of Or calculated in "Measurement of ionic conductivity of sintered body" described above. In other words, the ionic conductivities at 30° C., 40° C., 50° C., and 60° C. were plotted by taking the horizontal axis as the temperature and the vertical axis as the logarithm of ionic conductivity (log[ion conductivity]), and the activation energy (Ea) of lithium-ion conduction was calculated from the slope of a graph (Arrhenius plot) showing the temperature dependency of lithium-ion conductance by the Arrhenius equation: $\sigma = \sigma_0 \exp(-Ea/RT)$ (σ: lithium-ion conductance, $\sigma_0$: pre-exponential factor, R: gas constant, T: absolute temperature). The results are shown in Table 2. In Comparative Example 3, the density of the sintered body was low, so that the measurement could not be performed.

Comparison between Example 1 and Comparative Example 1 having the same composition (molar ratio of each element), comparison between Example 3 and Comparative Example 2, comparison between Example 5 and Comparative Example 3, and comparison between Example 8 and Comparative Example 4 showed that the sintered body obtained from the ceramic powder material containing the first garnet-type compound and the second garnet-type compound exhibited higher lithium-ion conductivity than that of the sintered bodies obtained from only the first garnet-type compound or only the second garnet-type compound.

TABLE 2

| | Heat treatment temperature (° C.) | Density of sintered body (g/cm$^3$) | Lithium-ion conductivity (mScm$^{-1}$) | Activation energy (Ea) of lithium-ion conduction (kJmol$^{-1}$) |
|---|---|---|---|---|
| Example 1 | 950 | 4.95 | 0.77 | 17.7 |
| Example 2 | 950 | 4.94 | 0.74 | 19.8 |
| Example 3 | 1050 | 4.85 | 0.45 | 23.7 |
| Example 4 | 1050 | 4.89 | 0.53 | 26.5 |
| Example 5 | 1140 | 4.12 | 0.16 | 28.9 |
| Example 6 | 1140 | 4.47 | 0.22 | 30.0 |
| Example 7 | 950 | 5.01 | 0.30 | 16.7 |
| Example 8 | 950 | 5.01 | 0.64 | 19.0 |
| Example 9 | 950 | 4.99 | 0.28 | 22.9 |
| Example 10 | 950 | 4.96 | 0.42 | 19.1 |
| Example 11 | 1050 | 4.88 | 0.46 | 21.8 |
| Example 12 | 1050 | 4.74 | 0.34 | 23.8 |
| Example 13 | 1050 | 4.54 | 0.23 | 25.2 |
| Comparative Example 1 | 950 | 4.33 | 0.18 | 24.5 |
| Comparative Example 2 | 1050 | 4.54 | 0.21 | 26.4 |
| Comparative Example 3 | 1140 | 3.12 | Unmeasurable | Unmeasurable |
| Comparative Example 4 | 950 | 3.81 | 0.06 | 20.7 |

The invention claimed is:

1. A ceramic powder material comprising:
a first garnet-type compound containing Li, La, and Zr; and
a second garnet-type compound containing Li, La, and Zr and having a composition different from a composition of the first garnet-type compound, wherein
the first garnet-type compound and the second garnet-type compound are represented by Formula [1] below:

$$Li_{7-(3x+y)}M1_xLa_3Zr_{2-y}M2_yO_{12} \quad [1]$$

where M1 is Al or Ga, and M2 is Nb or Ta,
the first garnet-type compound satisfies 0≤(3x+y)≤0.5, and
the second garnet-type compound satisfies 0.5≤(3x+y)≤1.5.

2. The ceramic powder material according to claim 1, wherein an absolute value of a difference between a value of (3x+y) of the first garnet-type compound and a value of (3x+y) of the second garnet-type compound is 0.15 or more and 1.5 or less, and a content of the first garnet-type compound is 10% by mass or more and 90% by mass or less when the ceramic powder material is taken as a whole.

3. The ceramic powder material according to claim 1, wherein a number of atoms of Li and a number of atoms of La satisfy Formula [2] below:

$$2.0 \leq [(\text{number of atoms of Li})/(\text{number of atoms of La})] \leq 2.5 \quad [2].$$

4. The ceramic powder material according to claim 1, wherein a number of atoms of M1, a number of atoms of M2, and a number of atoms of La satisfy Formula [3] below:

$$0.08 \leq [[3 \times (\text{number of atoms of M1}) + (\text{number of atoms of M2})]/(\text{number of atoms of La})] \leq 0.35 \quad [3].$$

5. The ceramic powder material according to claim 1, wherein a pore volume of the first garnet-type compound and a pore volume of the second garnet-type compound are 0.4 mL/g or more and 1.0 mL/g or less.

6. The ceramic powder material according to claim 1, wherein a specific surface area of the first garnet-type compound and a specific surface area of the second garnet-type compound are 0.6 m$^2$/g or more and 2.5 m$^2$/g or less.

7. The ceramic powder material according to claim 1, wherein a particle size D$_{50}$ of the first garnet-type compound and a particle size D$_{50}$ of the second garnet-type compound are 0.5 μm or more and 30 μm or less.

8. The ceramic powder material according to claim 1, comprising a compound containing one or more selected from the element group consisting of Mg, Ca, Ba, Sr, Y, and Sc.

9. The ceramic powder material according to claim 1, comprising Ga,
wherein a sintered body satisfying the following (1) and (2) is obtained from the ceramic powder material by a heat treatment at 950° C.:
(1) a density of the sintered body is 4.6 g/cm$^3$ or more; and
(2) a lithium-ion conductivity at a measurement temperature of 30° C. is 0.1 mS/cm or more.

10. The ceramic powder material according to claim 1, comprising Al and not comprising Ga,
wherein a sintered body satisfying the following (3) and (4) is obtained from the ceramic powder material by a heat treatment at 1,050° C.:
(3) a density of the sintered body is 4.6 g/cm$^3$ or more; and
(4) a lithium-ion conductivity at a measurement temperature of 30° C. is 0.1 mS/cm or more.

11. The ceramic powder material according to claim 1, comprising at least one of Nb or Ta and not comprising Al or Ga,
wherein a sintered body satisfying the following (5) and (6) is obtained from the ceramic powder material by a heat treatment at 1,140° C.:
(5) a density of the sintered body is 3.9 g/cm$^3$ or more; and
(6) a lithium-ion conductivity at a measurement temperature of 30° C. is 0.1 mS/cm or more.

12. A sintered body obtained by sintering the ceramic powder material according to claim 1.

13. A battery comprising a sintered body obtained by sintering the ceramic powder material according to claim 1.

* * * * *